US010007375B2

(12) United States Patent
Moriai

(10) Patent No.: US 10,007,375 B2
(45) Date of Patent: Jun. 26, 2018

(54) PORTABLE APPARATUS AND METHOD FOR CONTROLLING CURSOR POSITION ON A DISPLAY OF A PORTABLE APPARATUS

(71) Applicant: KYOCERA CORPORATION, Kyoto (JP)

(72) Inventor: Shinsuke Moriai, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 12 days.

(21) Appl. No.: 14/972,755

(22) Filed: Dec. 17, 2015

(65) Prior Publication Data

US 2016/0103554 A1 Apr. 14, 2016

Related U.S. Application Data

(63) Continuation of application No. PCT/JP2014/067052, filed on Jun. 26, 2014.

(30) Foreign Application Priority Data

Jun. 26, 2013 (JP) .................. 2013-134070
Jun. 26, 2013 (JP) .................. 2013-134072

(51) Int. Cl.
*G06F 3/041* (2006.01)
*G06F 3/0488* (2013.01)
(Continued)

(52) U.S. Cl.
CPC .......... *G06F 3/0416* (2013.01); *G06F 3/0481* (2013.01); *G06F 3/0482* (2013.01);
(Continued)

(58) Field of Classification Search
CPC ........ G06F 3/048; G06F 3/04812; G06F 8/34; G06F 8/38; G06F 9/4443; G06F 15/0225; G06F 17/30126; G06F 2206/1008
See application file for complete search history.

(56) References Cited

U.S. PATENT DOCUMENTS 8,884,897 B2 11/2014 Sashida et al.
9,154,606 B2 10/2015 Tseng et al.
(Continued)

FOREIGN PATENT DOCUMENTS

JP 2011-516936 5/2011
JP 2012-203432 10/2012
(Continued)

OTHER PUBLICATIONS

International Search Report from International Patent Application No. PCT/JP2014/067052, dated Sep. 2, 2014, in 1 page.
(Continued)

Primary Examiner — Sanghyuk Park
(74) Attorney, Agent, or Firm — Duane Morris LLP

(57) ABSTRACT

A mobile phone includes a processor and a touch detector configured to detect a touch position on a display. When the touch position is moved, the processor moves a cursor position along a path obtained by increasing a path of the touch position, and displays a cursor at the cursor position. When the touch position is no longer detected in a state in which the cursor position is on the display, the processor performs processing allocated to the cursor position concerning a home screen. The processor displays a notification list screen on the display based on movement of the cursor position out of the display before the touch position is no longer detected. When the touch position is no longer detected, the processor performs processing allocated to the cursor position concerning the notification list screen.

10 Claims, 22 Drawing Sheets

(51) Int. Cl.
G06F 3/0481 (2013.01)
H04M 1/725 (2006.01)
G06F 3/0482 (2013.01)

(52) U.S. Cl.
CPC ...... G06F 3/0488 (2013.01); H04M 1/72519 (2013.01); H04M 2250/22 (2013.01)

(56) References Cited

U.S. PATENT DOCUMENTS

| | | | | |
|---|---|---|---|---|
| 2006/0109259 | A1* | 5/2006 | Ohta | G06F 3/0485 345/173 |
| 2009/0237421 | A1* | 9/2009 | Kim | G06F 3/0485 345/661 |
| 2012/0117507 | A1 | 5/2012 | Tseng et al. | |
| 2014/0160073 | A1 | 6/2014 | Matsuki | |
| 2014/0347326 | A1* | 11/2014 | Yim | H04M 1/2477 345/179 |

FOREIGN PATENT DOCUMENTS

| | | |
|---|---|---|
| JP | 2012-203895 | 10/2012 |
| WO | WO 2013/018480 | 2/2013 |

OTHER PUBLICATIONS

Written Opinion of the International Searching Authority for International Patent Application No. PCT/JP2014/067052, dated Sep. 2, 2014, and Statement of Relevance of non-English references cited therein, in 4 pages.

\* cited by examiner

PORTABLE APPARATUS AND METHOD FOR CONTROLLING CURSOR POSITION ON A DISPLAY OF A PORTABLE APPARATUS

CROSS-REFERENCE TO RELATED APPLICATIONS

The present application is a continuation of International Application No. PCT/JP2014/067052, filed on Jun. 26, 2014, which claims the benefit of Japanese Patent Application No. 2013-134070, filed on Jun. 26, 2013, and Japanese Patent Application No. 2013-134072, filed on Jun. 26, 2013. International Application No. PCT/JP2014/067052 is entitled "PORTABLE DEVICE AND METHOD FOR CONTROLLING PORTABLE DEVICE", and both Japanese Patent Applications No. 2013-134070 and No. 2013-134072 are entitled "PORTABLE DEVICE, METHOD FOR CONTROLLING PORTABLE DEVICE, AND PROGRAM," and each are incorporated by reference herein in their entireties.

FIELD

Embodiments of the present disclosure relate to portable apparatuses, including mobile phones, personal digital assistants (PDAs), tablet PCs, e-book terminals, portable music players, portable TVs, and portable navigation systems, and, in particular, to a portable apparatus having a touch panel. Embodiments of the present disclosure further relate to control methods for use in the portable apparatuses.

BACKGROUND

A mobile phone having a display on the front of a housing has been known. In such a mobile phone, on the front of a housing having an approximately rectangular contour, an approximately rectangular display having a slightly smaller size than the housing is disposed. A touch panel is further disposed to overlap the display, and various application programs (hereinafter, simply referred to as "applications") are executed based on a touch operation by a user on the display.

FIG. 23 illustrates how the user operates the mobile phone. As illustrated in FIG. 23, more and more users hold a slightly lower portion of the mobile phone with one hand, and perform operations on the display, i.e., the touch panel disposed on the display, with the thumb.

The display of the mobile phone has recently become larger. In a case where operations are performed with the thumb as described above, the user can hardly reach, with the thumb, an area from an upper portion of the display to a side portion opposing the base of the thumb of the display as illustrated in alternate long and short dash lines in FIG. 23.

The user has to perform complicated operation, such as operation to switch the mobile phone to the other hand, to operate an object (e.g., an icon and a soft key) for operation in such an area that the user can hardly reach with the thumb.

SUMMARY

A portable apparatus and a method for controlling a portable apparatus are disclosed. In one embodiment, a portable apparatus includes a display, a detector, and a processor. The detector is configured to detect a touch position, on the display, at which a touch is made. The processor is configured to control the display based on results of detection by the detector. When the touch position is moved, the processor moves a cursor position along a path obtained by increasing a path of the touch position, and displays a cursor at the cursor position on the display. When the touch position is no longer detected by the detector in a state in which a first screen is displayed on the display and the cursor position is on the display, the processor performs processing allocated to the cursor position concerning the first screen. The processor displays a second screen on the display based on movement of the cursor position out of the display before the touch position is no longer detected by the detector. When the touch position is no longer detected by the detector in a state in which the second screen is displayed on the display, the processor performs processing allocated to the cursor position concerning the second screen.

In one embodiment, a portable apparatus includes a display, a detector, and a processor. The detector is configured to detect a touch position, on the display, at which a touch is made. The processor is configured to control the display based on results of detection by the detector. The processor sets a first reference position and a second reference position on the display before the touch position is moved. The first reference position relates to the touch position. The second reference position relates to a cursor position. When the touch position is moved, the processor determines, as the cursor position, a position distant from the second reference position by a second vector obtained by increasing a first vector between the touch position detected by the detector and the first reference position to move the cursor position along a path obtained by increasing a path of the touch position, and displays a cursor indicating a position as a target for an operation at the cursor position on the display. In a case where the cursor position is out of a range in which the cursor is capable of being displayed on the display, the processor newly sets the second reference position on the display, and newly sets, as the first reference position, the touch position when the cursor position is out of the range in which the cursor is capable of being displayed.

In one embodiment, a method for controlling a portable apparatus that controls a display by detecting a touch position, on the display, at which a touch is made includes a moving step, a first performing step, a displaying step, and a second performing step. The moving step is a step of moving, when the touch position is moved, a cursor position along a path obtained by increasing a path of the touch position, and displaying a cursor at the cursor position on the display. The first performing step is a step of performing, when the touch position is no longer detected in a state in which a first screen is displayed on the display and the cursor position is on the display, processing allocated to the cursor position concerning the first screen. The displaying step is a step of displaying a second screen on the display based on movement of the cursor position out of the display before the touch position is no longer detected. The second performing step is a step of performing, when the touch position is no longer detected in a state in which the second screen is displayed on the display, processing allocated to the cursor position concerning the second screen.

In one embodiment, a method for controlling a portable apparatus that controls a display by detecting a touch position, on the display, at which a touch is made includes a setting step, a determining step, and a newly setting step. The setting step is a step of setting a first reference position and a second reference position on the display before the touch position is moved. The first reference position relates to the touch position. The second reference position relates to a cursor position. The determining step is a step of determining, when the touch position is moved, as the cursor position, a position distant from the second reference position by a second vector obtained by increasing a first vector between the touch position as detected and the first reference position to move the cursor position along a path obtained by increasing a path of the touch position, and displaying a cursor indicating a position as a target for an operation at the cursor position on the display. The newly setting step is a step of newly setting, in a case where the cursor position is out of a range in which the cursor is capable of being displayed on the display, the second reference position on the display, and newly setting, as the first reference position, the touch position when the cursor position is out of the range in which the cursor is capable of being displayed.

DETAILED DESCRIPTION

Embodiments of the present disclosure are described below with reference to the drawings.

Figure 1:
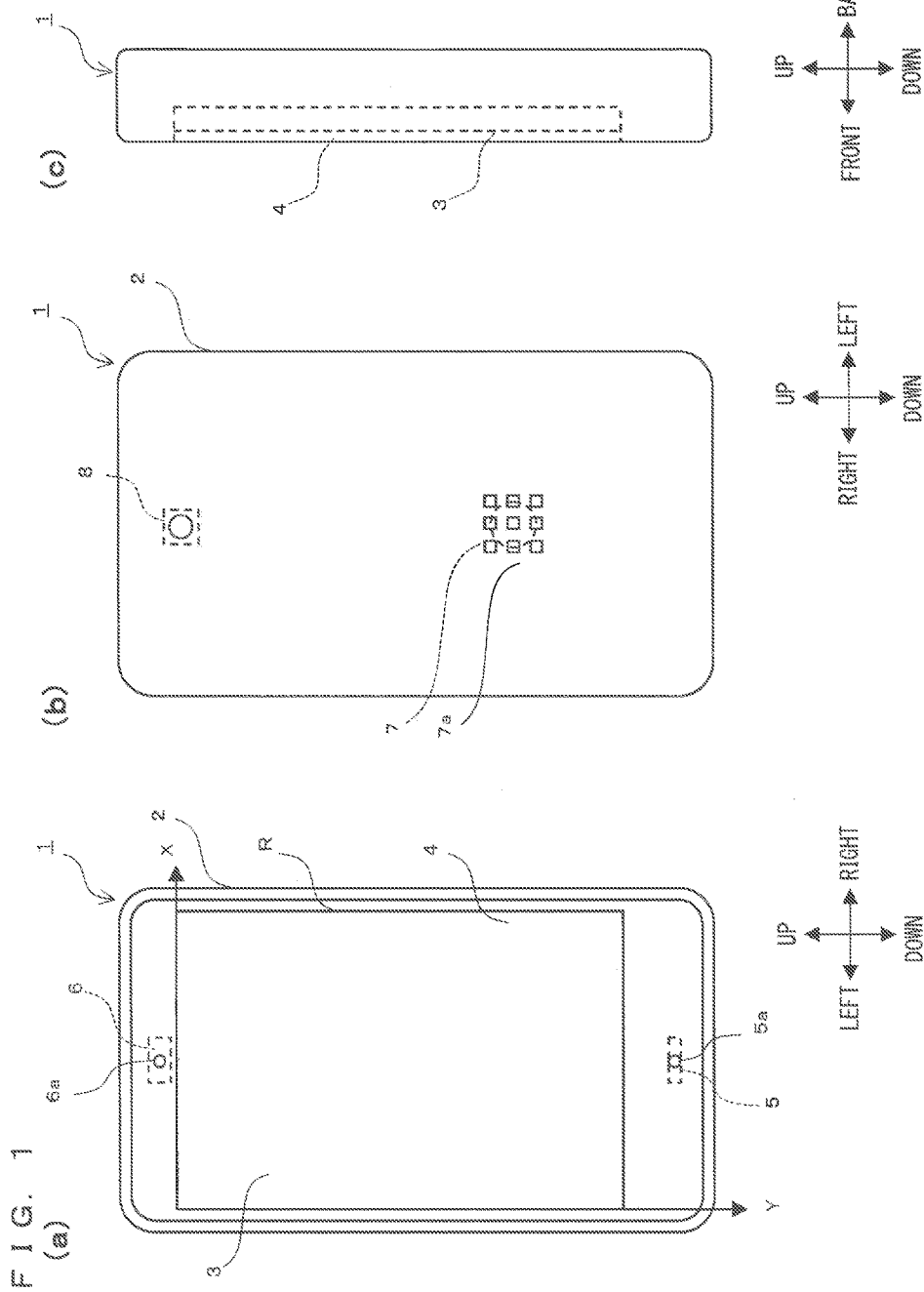
FIG. 1 illustrates configuration of a mobile phone according to one embodiment.

Parts (a), (b), and (c) of FIG. 1 respectively illustrate a front view, a back view, and a right side view of a mobile phone 1. As illustrated in FIG. 1, the longitudinal direction and the transverse direction of a cabinet 2 are hereinafter respectively defined as the vertical direction and the horizontal direction, for convenience's sake.

As illustrated in FIG. 1, the mobile phone 1 includes the cabinet 2, a display 3, a touch panel 4, a microphone 5, a communication speaker 6, an external speaker 7, and a camera 8.

The cabinet 2 has an approximately rectangular contour when viewed from the front. The display 3 is disposed on the front of the cabinet 2. Various images (screens) are displayed in a display area R of the display 3. The display 3 is a liquid crystal display, for example. The display 3 may be another type of display, such as an organic EL display. The touch panel 4 is disposed to cover the display 3. The touch panel 4 is formed to be a transparent sheet. Various types of touch panels, including a capacitive touch panel, an ultrasonic touch panel, a pressure-sensitive touch panel, a resistive touch panel, and an optical sensing touch panel, can be used as the touch panel 4.

The microphone 5 is disposed inside the cabinet 2 at a lower end of the cabinet 2. The communication speaker 6 is disposed inside the cabinet 2 at an upper end of the cabinet 2. The microphone 5 can receive voice passing through a microphone hole 5a formed in the front of the cabinet 2. The microphone 5 can generate electrical signals in accordance with input sound. The communication speaker 6 can output sound. The output sound passes through an output hole 6a formed in the front of the cabinet 2, and is released to the outside the cabinet 2. During communication, voice received from a communication destination apparatus (e.g., mobile phone) is output from the communication speaker 6, and voice generated by a user is input into the microphone 5. Sound includes various types of sound, such as voice and notification sound.

The external speaker 7 is disposed inside the cabinet 2. Output holes 7a are formed in the back of the cabinet 2 to face the external speaker 7. Sound output from the external speaker 7 passes through the output holes 7a, and is released to the outside the cabinet 2.

The camera 8 is disposed on the back of the cabinet 2 in an upper portion of the cabinet 2. The camera 8 includes an imaging device, such as a CCD and a CMOS sensor, and photographs an object.

Figure 2:
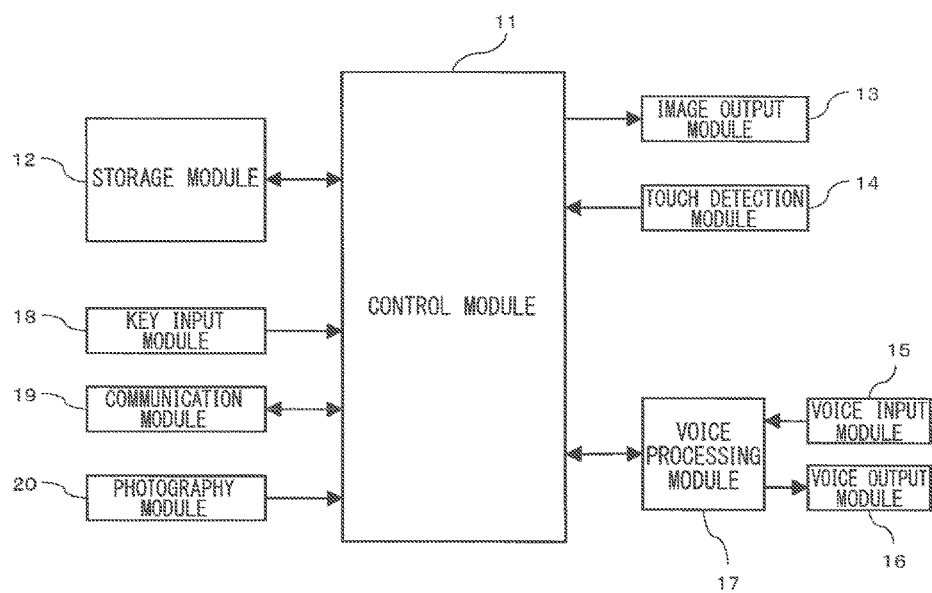
FIG. 2 illustrates a block diagram showing overall configuration of the mobile phone according to one embodiment.

FIG. 2 illustrates a block diagram showing overall configuration of the mobile phone 1.

As illustrated in FIG. 2, the mobile phone 1 includes a control module 11, a storage module 12, an image output module 13, a touch detection module 14, a voice input module 15, a voice output module 16, a voice processing module 17, a key input module 18, a communication module 19, and an imaging module 20.

The storage module 12 includes ROM, RAM, and external memory. Various programs are stored in the storage module 12. The programs stored in the storage module 12 include control programs for controlling components of the mobile phone 1 and various applications (e.g., home, telephone, email, web browser, map, game, and schedule management applications). The programs stored in the storage module 12 further include programs for performing control processing in a cursor mode, which is described below. These programs are stored in the storage module 12 by the manufacturer of the mobile phone 1 during manufacture, or are stored in the storage module 12 by the user over a communication network or via a storage medium, such as a memory card and CD-ROM.

The storage module 12 has a working area in which data temporarily used or generated during execution of a program is stored.

The control module 11 includes a computer or a CPU. The control module 11 can control components (e.g., the storage module 12, the image output module 13, the touch detection module 14, the voice input module 15, the voice output module 16, the voice processing module 17, the key input module 18, the communication module 19, and the imaging module 20) of the mobile phone 1 in accordance with the programs stored in the storage module 12.

The image output module 13 includes the display 3 illustrated in FIG. 1. The image output module 13 can display an image (a screen) on the display 3 based on a control signal and an image signal from the control module 11.

The touch detection module 14 includes the touch panel 4 illustrated in FIG. 1. The touch detection module 14 can detect a touch operation by the user on the display 3 illustrated in FIG. 1 using the touch panel 4. This means that, in a case where the user touches a position in the display area R of the display 3, the touch detection module 14 can detect the position of the touch (hereinafter, referred to as a "touch position") of the user using the touch panel 4. The touch detection module 14 can output position signals generated based on the detected touch position to the control module 11. As illustrated in the part (a) of FIG. 1, a Cartesian coordinate system with an upper left corner of the display 3 as the origin, the horizontal direction as the x-axis, and the vertical direction as the y-axis is set on the display 3. When the display 3 is touched with a finger, the touch panel 4 can output a coordinate value indicating the touch position on the display 3.

When the finger of the user is in close proximity to the display 3, the touch panel 4 may detect a position at which the finger is in close proximity to the display 3 as the touch position.

The touch panel 4 of the mobile phone 1 enables the user to perform various touch operations by touching the display 3 with the finger. The touch operations include a tap operation, a flick operation, a slide operation, a drag operation, and a long touch operation, for example. The tap operation refers to an operation by the user to touch the display 3 with the finger, and, in a short time period after the touch, release the finger from the display 3. The flick operation refers to an operation by the user to touch the display 3 with the finger, and then flick the display 3 with the finger in a given direction. The slide operation refers to an operation by the user to move the finger in a given direction while touching the display 3 with the finger. The drag operation refers to an operation by the user to perform the slide operation with respect to a target of movement, such as an icon, and then release the finger from the display 3. The long touch operation refers to an operation by the user to touch the display 3 with the finger for a long time period without moving the finger.

For example, in a case where the touch detection module 14 detects the touch position, when the touch position is no longer detected within a predetermined first time period after detection of the touch position, the control module 11 determines the touch operation as the tap operation. When the touch position is moved by a predetermined first distance or more within a predetermined second time period after detection of the touch position, and then the touch position is no longer detected, the control module 11 determines the touch operation as the flick operation. When the touch position is moved by a predetermined second distance or more after detection of the touch position, the control module 11 determines the touch operation as the slide operation. When the touch position is detected for a third time period or more without being moved by a predetermined third distance or more after detection of the touch position, the control module 11 determines the touch operation as the long touch operation.

The voice input module 15 includes the microphone 5. The voice input module 15 can output electrical signals from the microphone 5 to the voice processing module 17.

The voice output module 16 includes the communication speaker 6 and the external speaker 7. Electrical signals from the voice processing module 17 are input into the voice output module 16. The voice output module 16 can output sound from the communication speaker 6 or the external speaker 7.

The voice processing module 17 can perform AD conversion and the like on electrical signals from the voice input module 15, and output digital voice signals after conversion to the control module 11. The voice processing module 17 can also perform decoding, DA conversion, and the like on digital voice signals from the control module 11, and output electrical signals after conversion to the voice output module 16.

The key input module 18 includes at least one hard key. For example, the key input module 18 includes a power key for supplying power to the mobile phone 1. When at least one of various hard keys (not illustrated) disposed on the mobile phone 1 is pressed, the key input module 18 can output a signal corresponding to the pressed hard key to the control module 11.

The communication module 19 includes a circuit for converting signals and an antenna for transmitting and receiving electric waves for calls and communications. The communication module 19 can convert signals for calls and communications input from the control module 11 into radio signals, and transmit the radio signals after conversion to a communication destination, such as a base station and another communication apparatus, through the antenna. The communication module 19 can also convert radio signals received through the antenna into signals that can be used by the control module 11, and output the signals after conversion to the control module 11.

The imaging module 20 includes the camera 8 illustrated in the part (b) of FIG. 1. The imaging module 20 can perform various types of image processing on image data of an image photographed by the camera 8, and output the image data after image processing to the control module 11.

Figure 3:
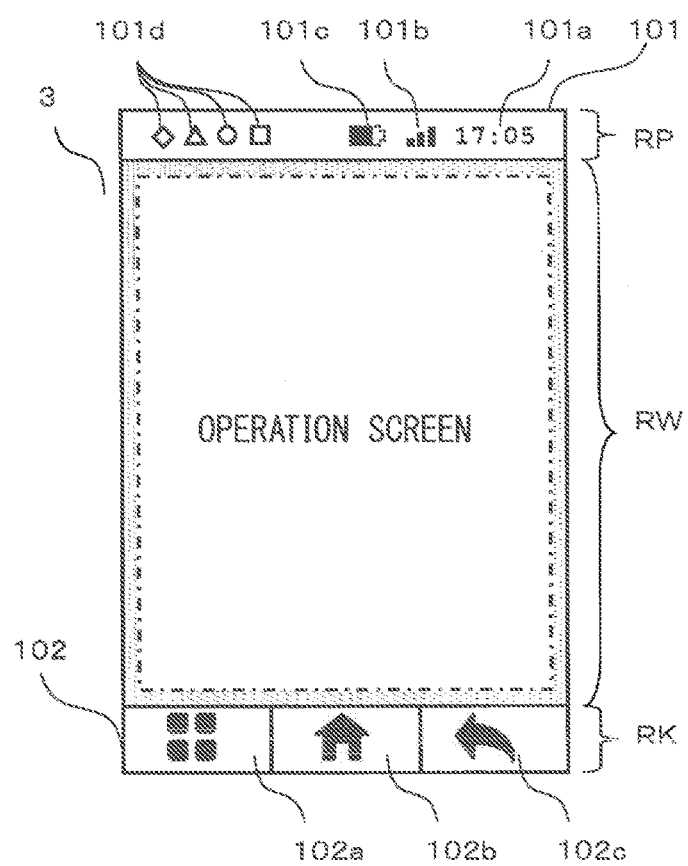
FIG. 3 illustrates a diagram for explaining a screen displayed on a display by executing an application according to one embodiment.

FIG. 3 illustrates a diagram for explaining a screen displayed on the display 3 by executing an application. The control module 11 can execute various applications as described above. After executing an application, the control module 11 can perform processing in accordance with the touch operation by the user on the display 3, and display a screen based on the processing on the display 3.

As illustrated in FIG. 3, the screen displayed on the display 3 includes a picto area RP, a window area RW, and a key area RK. A notification bar 101 is displayed in the picto area RP. The notification bar 101 includes current time 101a, an intensity meter 101b indicating intensity of electric waves, and a remaining amount meter 101c indicating a remaining amount of battery power. The notification bar 101 further includes notification icons 101d corresponding to notification information pieces, other than the current time 101a, the intensity meter 101b, and the remaining amount meter 101c, to be notified to the user. Examples of the other notification information pieces include information on missed calls (e.g., a telephone number and a caller name), information on incoming emails (e.g., an email address and a sender name), information indicating that time to sound an alarm for notification has elapsed, information indicating that scheduled time has elapsed, information on updating of the mobile phone 1, and information indicating that external memory has been connected to the mobile phone 1. The user can roughly check the notification information pieces by checking the notification bar 101.

An operation key group 102 is displayed in the key area RK. The operation key group 102 includes a set key 102a, a home key 102b, and a back key 102c. The set key 102a is a key to mainly display a set screen for providing various settings on the display 3. The home key 102b is a key to mainly cause display on the display 3 to transition from another screen to a home screen. The back key 102c is a key to mainly return performed processing to processing one step before the performed processing.

An operation screen when an application is executed is displayed in the window area RW. In a case where a home application is executed, for example, the home screen is displayed in the window area RW. In the home screen, startup icons for starting various applications, such as telephone and email applications, on the display 3 (in the foreground) are arranged. In a case where the telephone application is executed, a dial screen, an incoming call list screen, and the like are displayed in the window area RW. In a case where a web browser application is executed, a web screen is displayed in the window area RW based on data acquired from an external server.

At least one of the picto area RP and the key area RK may not be displayed depending on an application to be executed. In this case, the window area RW may be expanded to the picto area RP and/or the key area RK. That is to say, the window area RW may form the entire screen. In a case where the picto area RP is not displayed, for example, the operation screen when the application is executed may be displayed in the window area RW having been expanded to the picto area RP. In a case where the key area RK is not displayed, the operation screen when the application is executed may be displayed in the window area RW having been expanded to the key area RK. In a case where neither the picto area RP nor the key area RK is displayed, the operation screen when the application is executed may be displayed in the window area RW having been expanded to the display 3 as a whole.

Figure 4:
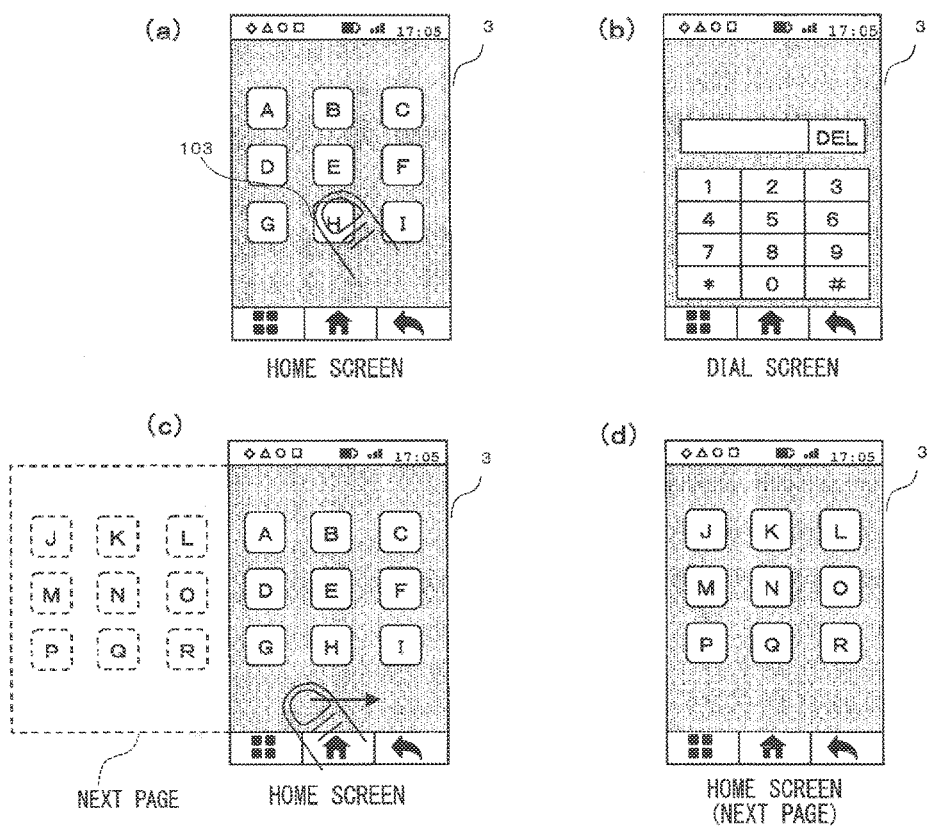
FIG. 4 illustrates examples of screen display in a case where processing is performed in accordance with a touch operation on the display according to one embodiment.

FIG. 4 illustrates examples of screen display in a case where processing is performed in accordance with a touch operation on the display 3.

When the tap operation on the home key 102b is detected, the control module 11 executes the home application, and displays the home screen on the display 3. In the home screen, startup icons 103 for starting various applications are arranged. For example, as illustrated in a part (a) of FIG. 4, when the user performs the tap operation on one of the startup icons 103 corresponding to the telephone application, the telephone application is started on the display 3, and the dial screen is displayed on the display 3 as illustrated in a part (b) of FIG. 4. The dial screen is a screen for the user to input a telephone number to make a call.

As illustrated in a part (c) of FIG. 4, the home screen includes a plurality of pages. In a case where the pages are provided to the left, for example, when the flick operation to the right is performed on a given position in the home screen, the home screen is scrolled, and the next page is displayed on the display 3 as illustrated in a part (d) of FIG. 4. The plurality of pages may be ranked. For example, when the flick operation is detected in a case where any screen is displayed, the control module 11 may select, based on the flick operation, one of screens that correspond to positions before and after a position given to the screen on which the flick operation has been performed, and display the selected screen on the display 3.

Figure 5:
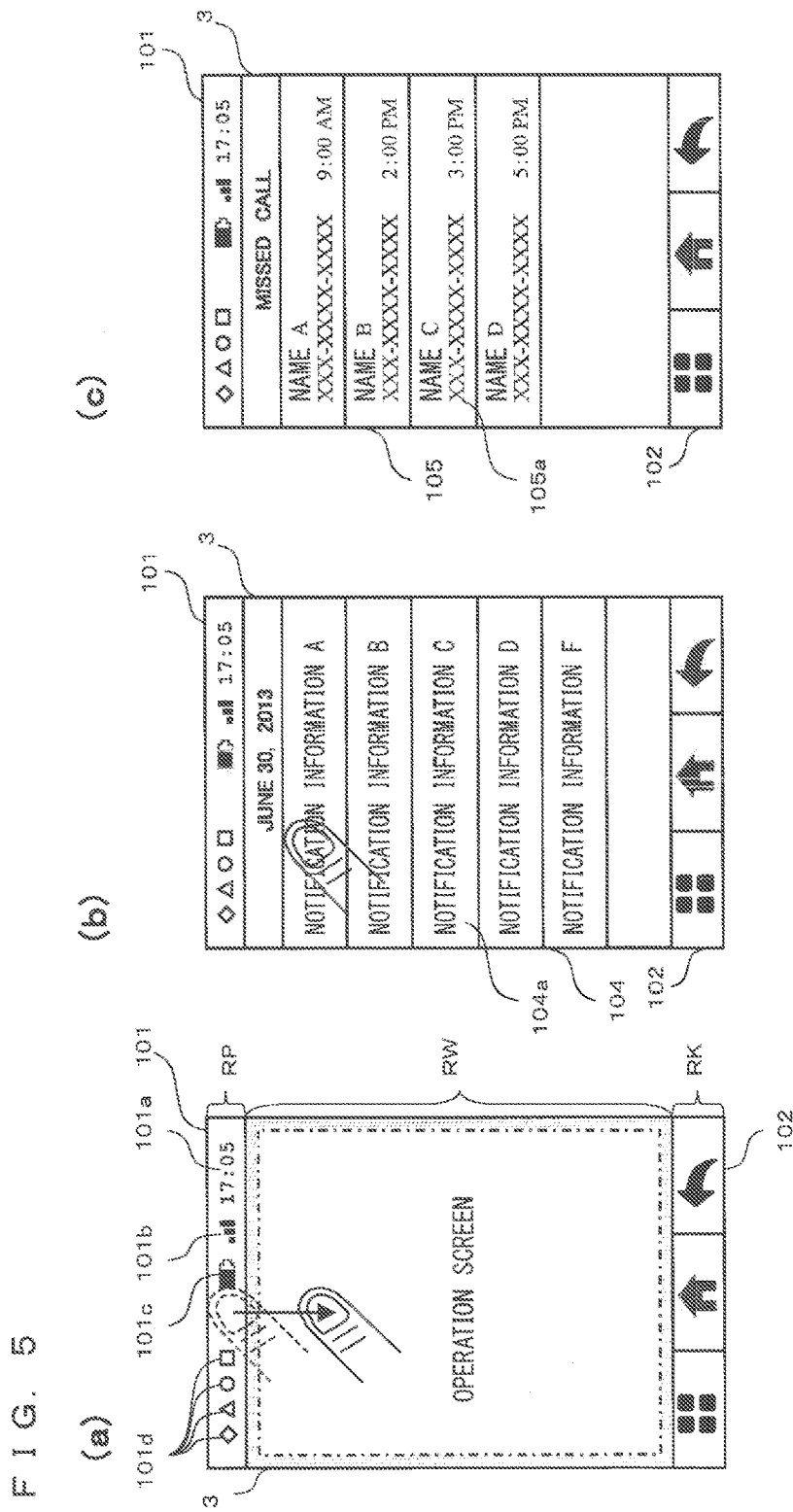
FIG. 5 illustrates a diagram for explaining a notification list screen displayed on the display according to one embodiment.

FIG. 5 illustrates a diagram for explaining a notification list screen 104 displayed on the display 3.

The notification bar 101 in the picto area RP of the display 3 functions as an object used for an operation to display the notification list screen 104 on the display 3. Notification information pieces indicated by the notification icons 101d and the like in the notification bar 101 are displayed in more detail in the notification list screen 104.

When the user performs a downward slide operation on the notification bar 101 as illustrated in a part (a) of FIG. 5, the notification list screen 104 is displayed on the display 3 (in the window area RW) as illustrated in a part (b) of FIG. 5. In this case, the notification list screen 104 is displayed to appear from a lower end of the notification bar 101 as if the notification list screen 104 was drawn from the notification bar 101 by the slide operation.

The notification information pieces are displayed, in respective display fields 104a of the notification list screen 104, in more detail than in the notification icons 101d and the like. In a case where a notification information piece is a missed call information piece, for example, the number of missed calls and the latest missed call information piece (e.g., a telephone number) are displayed in a display field 104a.

As illustrated in the part (b) of FIG. 5, in a case where the user responds to desired one of the notification information pieces, the user performs the tap operation on one of the display fields 104a corresponding to the desired notification information piece. As a result, an application corresponding to the notification information piece on which the tap operation has been performed is started. In a case where the notification information piece is the missed call information piece, for example, the telephone application is started, and, as illustrated in a part (c) of FIG. 5, a missed call list screen 105 in which missed call information pieces are displayed in respective display fields 105a is displayed on the display 3.

Figure 23:
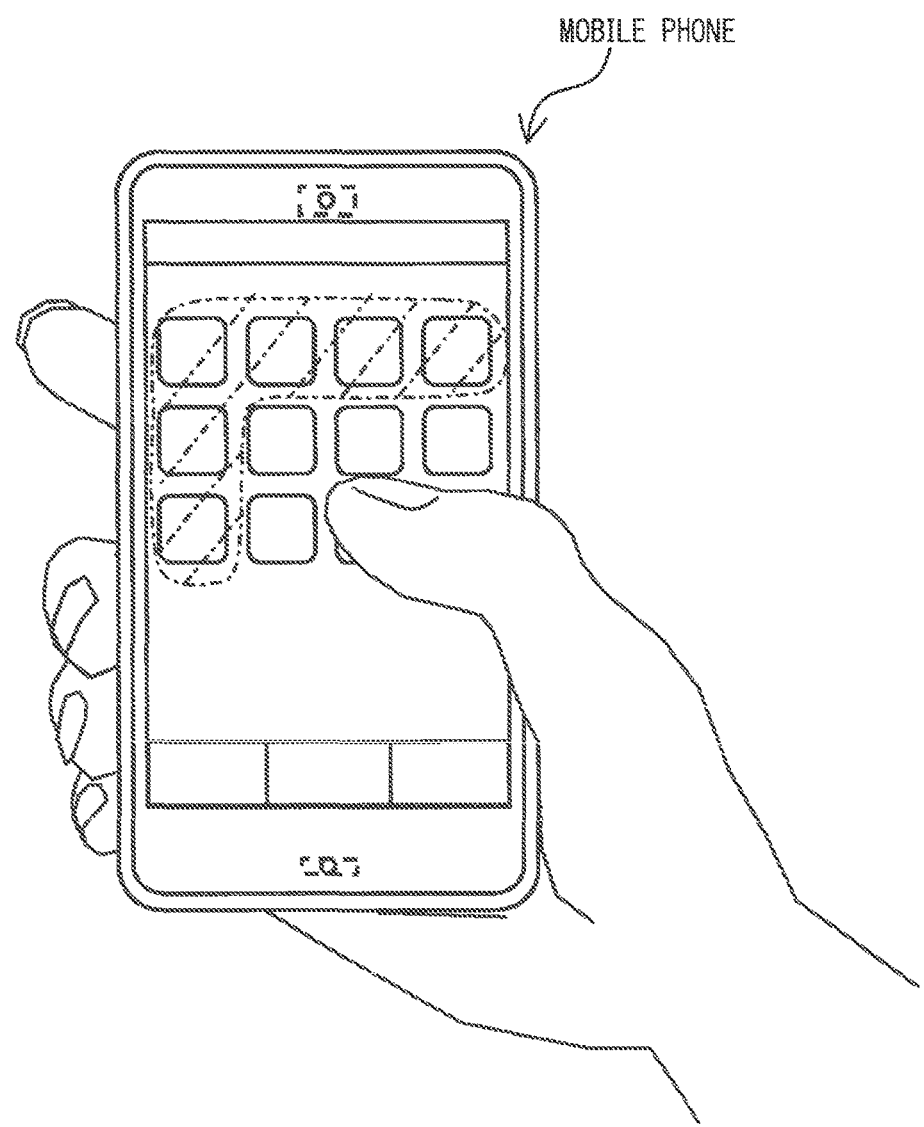
FIG. 23 illustrates how a user operates a mobile phone.

In many cases, when using the mobile phone 1, the user holds the body of the apparatus with one hand, and performs the touch operation on the display 3 with the thumb. As illustrated in FIG. 23, the user can hardly reach a position, on the display 3, distant from the thumb. Thus, in a case where there is an object, such as a startup icon 103, as a target for an operation at the position that the user can hardly reach, and the user performs the touch operation on the object, the user may have to switch the mobile phone 1 to the other hand.

In order to allow the user to smoothly perform the operation with one hand, the mobile phone 1 according to one embodiment has, as an operation mode, a cursor mode, which is described below, in addition to a normal mode in which the above-mentioned tap operation and flick operation are received.

The cursor mode is described below with reference to FIGS. 6 to 10.

Figure 6:
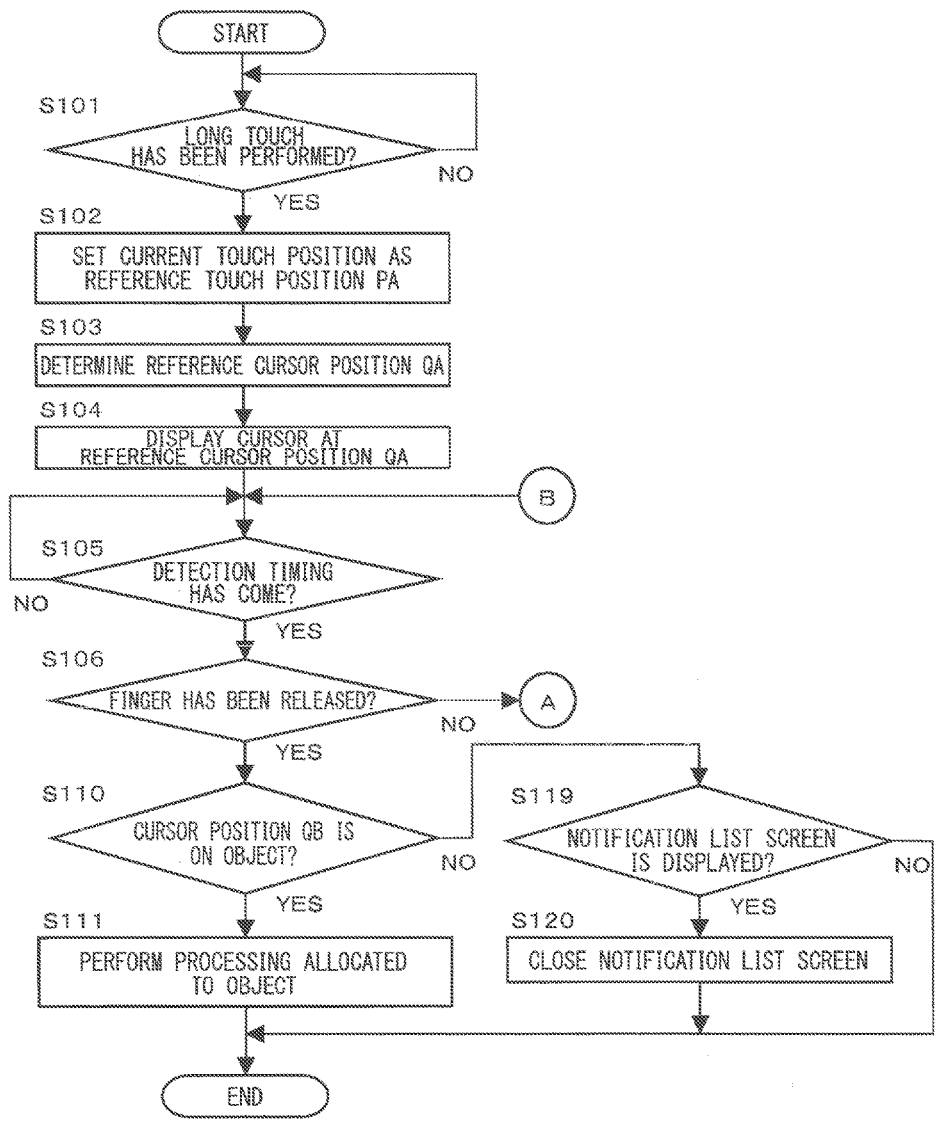
FIG. 6 illustrates a flowchart showing control processing in a cursor mode in one embodiment.
Figure 7:
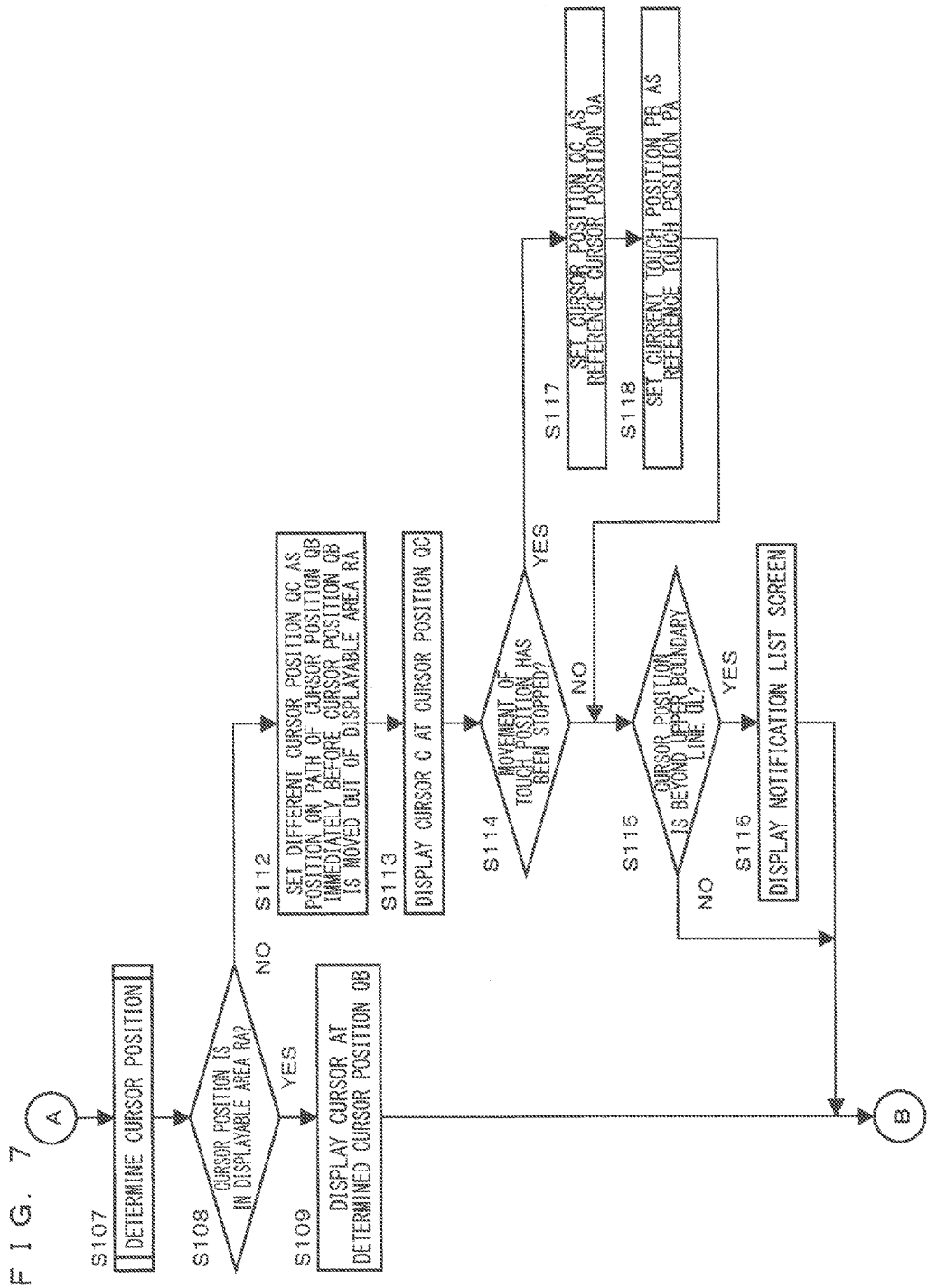
FIG. 7 illustrates a flowchart showing control processing in the cursor mode in one embodiment.
Figure 8:
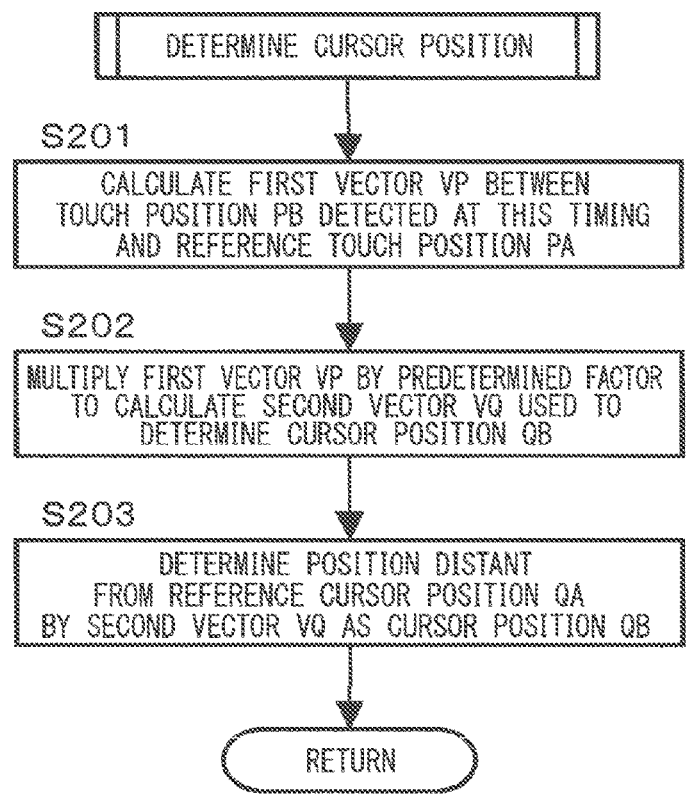
FIG. 8 illustrates a flowchart showing control processing in the cursor mode according to one embodiment.
Figure 9:
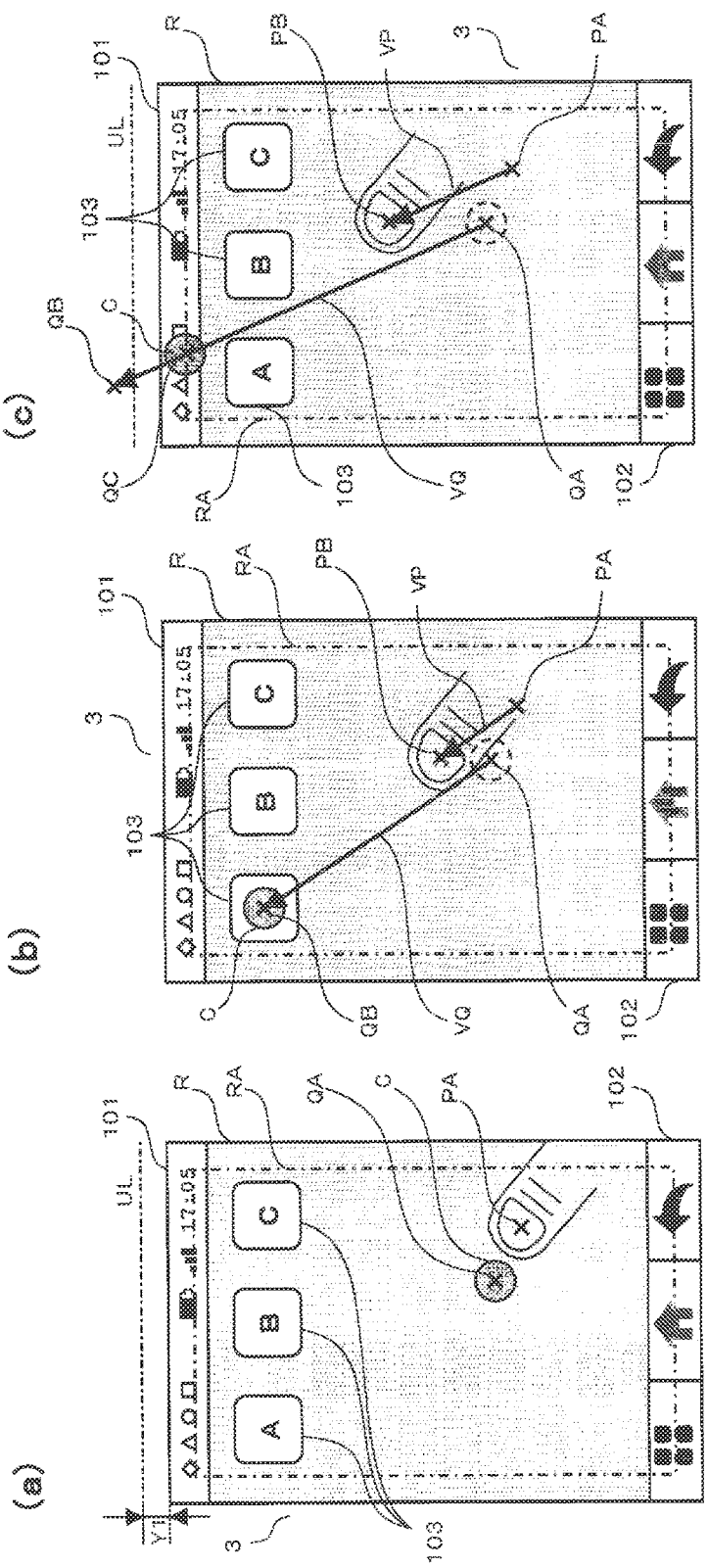
FIG. 9 illustrates examples of screen display in a case where control processing in the cursor mode is performed according to one embodiment.
Figure 10:
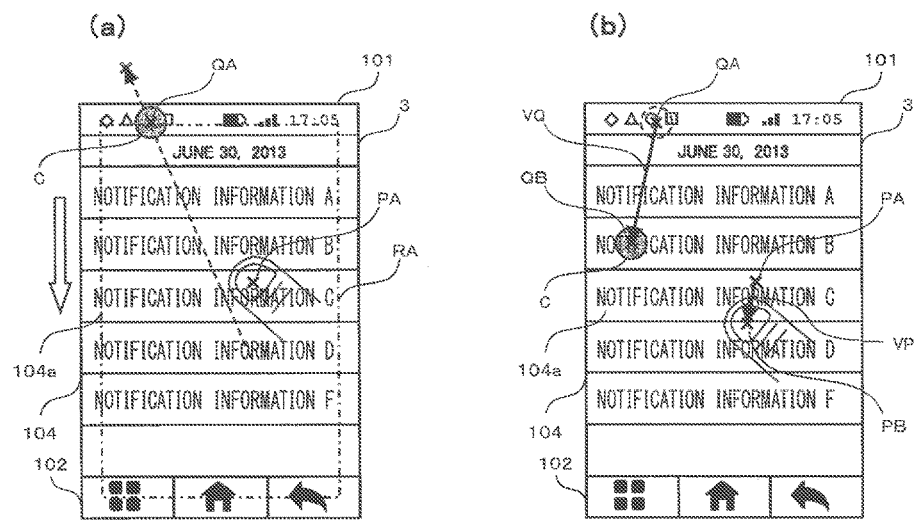
FIG. 10 illustrates examples of screen display in a case where control processing in the cursor mode is performed according to one embodiment.

FIGS. 6 to 8 illustrate flowcharts showing control processing in the cursor mode. FIGS. 6 and 7 illustrate flowcharts showing a main processing routine. FIG. 8 illustrates a flowchart showing a processing routine to determine a cursor position. FIGS. 9 and 10 illustrate examples of screen display in a case where control processing in the cursor mode is performed. In FIG. 9, the home screen is displayed on the display 3.

The main processing routine is described with reference to the flowcharts of FIGS. 6 and 7. The flowcharts of FIGS. 6 and 7 are connected to each other at signs A and B.

The control module 11 monitors whether the long touch operation has been performed on the display 3 (S101). In one embodiment, the long touch operation is an operation to switch the operation mode from the normal mode to the cursor mode.

In a case where a user who performs operations with one hand performs an operation on the startup icons 103 and the notification bar 101 in an upper portion of the display 3, the user performs the long touch operation on a given position on the display 3 with the thumb to cause the operation mode to transition to the cursor mode as illustrated in a part (a) of FIG. 9.

When the long touch operation has been performed (S101: YES), the control module 11 sets a current touch position acquired from the touch detection module 14 as a reference touch position PA (S102). The control module 11 then determines a reference cursor position QA (S103), and displays a cursor C at the determined reference cursor position QA (S104).

Display of the cursor C enables the user to know that the operation mode has been switched to the cursor mode. If the reference cursor position QA and the reference touch position PA are the same, the cursor C may be hidden by the finger, and thus the user may not be able to easily know switching to the cursor mode. As illustrated in the part (a) of FIG. 9, the control module 11 thus sets a position distant from the reference touch position PA by a predetermined vector as the reference cursor position QA.

Although the cursor C is circular for convenience's sake in one embodiment, the cursor C may have any shape, such as an arrow shape.

The control module 11 then determines whether the next detection timing to detect the touch position using the touch detection module 14 has come (S105). When the next detection timing has come (S105: YES), the control module 11 determines whether the finger has been released from the display 3 based on whether the touch detection module 14 has detected the touch position (S106). The control module 11 determines that the finger has been released from the display 3 in a case where the touch position having been detected at the previous detection timing is no longer detected.

As illustrated in a part (b) of FIG. 9, in a case where the user wants to operate a startup icon 103 in an upper right portion of the display 3, the user moves the finger towards the startup icon 103 as the target while touching the display 3. As a result, the touch position is moved on the display 3.

When determining that the finger has not been released (S106: NO), the control module 11 determines a cursor position QB based on a touch position PB detected at this detection timing (S107). The cursor position QB is a position at which the cursor C is displayed. In a case where the determined cursor position QB is out of a displayable area RA, which is described below, the cursor C is not displayed at the cursor position QB.

The processing routine to determine the cursor position is described herein with reference to the flowchart of FIG. 8. The control module 11 calculates a first vector VP between the touch position PB detected at this detection timing and the reference touch position PA (S201). The control module 11 then multiplies the first vector VP by a predetermined factor (of 3, for example) to calculate a second vector VQ used to determine the cursor position QB (S202). The control module 11 determines a position distant from the reference cursor position QA by the second vector VQ as the cursor position QB (S203).

Referring back to the flowcharts of FIGS. 6 and 7, when the cursor position QB is determined, the control module 11 determines whether the determined cursor position QB is in the displayable area RA (S108). As illustrated in the part (a) of FIG. 9, the control module 11 provides the displayable area RA on the display 3. The displayable area RA is an area in which, when the cursor C is displayed at the cursor position QB, the cursor C can be displayed without protruding from the display area R of the display 3. Coordinate data indicating the displayable area RA is stored in the storage module 12.

When the determined cursor position QB is in the displayable area RA (S108: YES), the control module 11 displays the cursor C at the determined cursor position QB (S109).

As described above, the user moves the finger while touching the display 3 to repeat processing in steps S105 to S109, and to move the cursor position QB, i.e., the cursor C, on the display 3 along a path obtained by increasing a path of the touch position by the predetermined factor. The cursor C finally reaches the startup icon 103 in the upper right portion.

The user releases the finger from the display 3 in a state in which the cursor C is on the startup icon 103 in the upper right portion. When determining that the finger has been released from the display 3 (S106: YES), the control module 11 determines whether the cursor position QB at the time of releasing is on the object, such as the startup icons 103 and the display fields 104*a* of the notification list screen 104, as the target for the operation (S110). When the cursor position QB is on the object (S110: YES), the control module 11 performs processing allocated to the object (S111). In a case where the object is the startup icon 103 corresponding to the telephone application, for example, the control module 11 starts the telephone application, and displays the dial screen as illustrated in the part (b) of FIG. 4 on the display 3.

In a case where the user wants to operate the notification bar 101 in an upper end portion of the display 3, the user greatly moves the finger upwards while touching the display 3 so that the cursor position QB is moved beyond an upper side of the display 3 as illustrated in a part (c) of FIG. 9.

The control module 11 provides an upper boundary line UL at a position above and distant from the upper side of the display 3 by a predetermined distance Y1 as illustrated in the part (a) of FIG. 9. The upper boundary line UL is a threshold set with respect to the cursor position QB, and is used to determine whether to display the notification list screen 104 (FIG. 5) on the display 3. Coordinate data indicating the upper boundary line UL is stored in the storage module 12.

In a case where the user moves the finger upwards, the above-mentioned processing in steps S105 to S109 is repeated until the cursor position QB is moved out of the displayable area RA. When the cursor position QB is moved out of the displayable area RA, the control module 11 determines that the cursor position QB is not in the displayable area RA, i.e., out of the displayable area RA, in step S108 (S108: NO). The control module 11 sets a cursor position QC different from the cursor position QB as a position on a path of the cursor position QB immediately before the cursor position QB is moved out of the displayable area RA (S112), and displays the cursor C at the set cursor position QC (S113). In a case where the cursor position QB is moved beyond an upper side of the displayable area RA, the cursor C is displayed in the upper end portion of the display 3 as illustrated in the part (c) of FIG. 9.

The control module 11 determines whether movement of the touch position has been stopped (S114). When upward movement of the touch position continues and is not stopped (S114: NO), the control module 11 determines whether the cursor position QB is beyond the upper boundary line UL (S115). When the cursor position QB is not beyond the upper boundary line UL (S115: NO), processing returns to the processing in step S105.

As described above, the processing in steps S105 to S108 and steps S112 to S115 is repeated until the cursor position QB is moved beyond the upper boundary line UL after the cursor position QB is moved out of the displayable area RA.

The cursor position QB is finally moved beyond the upper boundary line UL as illustrated in the part (c) of FIG. 9. When determining that the cursor position QB is beyond the upper boundary line UL in step S115 (S115: YES), the control module 11 displays the notification list screen 104 on the display 3 as illustrated in a part (a) of FIG. 10 (S116). The notification list screen 104 is displayed to appear from the lower end of the notification bar 101.

After the notification list screen 104 is displayed, processing in step S116 is not performed even when it is determined that the cursor position QB is beyond the upper boundary line UL in step S115.

The user stops moving the finger upon knowing that the notification list screen 104 is displayed. Movement of the touch position is thus stopped. When determining that movement of the touch position has been stopped in step S114 (S114: YES), the control module 11 newly sets the cursor position QC at which the cursor C is currently being displayed as the reference cursor position QA as illustrated in the part (a) of FIG. 10 (S117). Furthermore, the control module 11 newly sets the current touch position PB as the reference touch position PA (S118).

In a case where the user selects desired one of notification information pieces from the notification list screen 104, the user moves the cursor C to one of the display fields 104*a* (FIG. 10) corresponding to the desired notification information piece while touching the display 3. As a result, processing in steps S105 to S109 is repeated.

In this case, the reference cursor position QA and the reference touch position PA newly set in steps S117 and S118 are used in the processing routine to determine the cursor position shown in FIG. 7. This means that the control module 11 calculates the second vector VQ from the first vector VP between the touch position PB detected at this time and the reference touch position PA newly set (S201 and S202). The control module 11 then determines a position distant from the newly set reference cursor position QA by the second vector VQ as the cursor position QB (S203). As described above, as illustrated in the part (b) of FIG. 9, when the user moves the finger so that the cursor C is moved towards the desired notification information piece, the cursor C is immediately moved in the same direction as the direction of movement of the finger.

When the cursor C (cursor position QB) reaches the display field 104*a* (FIG. 10) corresponding to the desired notification information piece, and the user releases the finger at the position, the control module 11 determines that the finger has been released in step S106 (S106: YES). Since the cursor position QB is on the display field 104*a* as the object (S110: YES), the control module 11 performs processing allocated to the object, i.e., executes an application corresponding to the notification information piece shown in the display field 104*a* (S111).

In a case where the user only views the notification information pieces in the notification list screen 104, and closes the notification list screen 104, the user releases the finger in a state in which the cursor position QB is on none of the display fields 104*a*.

When determining that the cursor position QB is not on the object in step S110 (S110: NO), the control module 11 determines whether the notification list screen 104 is displayed on the display 3 (S119). When the notification list screen 104 is displayed (S119: YES), the control module 11 closes the notification list screen 104 (S120).

In addition to a case where the user intentionally moves the cursor position QB out of the display 3 to display the notification list screen 104 as described above, there is a case where the cursor position QB is moved out of the displayable area RA when the user greatly moves the finger by mistake in an attempt to move the cursor C (cursor position QB) on the display 3.

In this case, when the user stops moving the finger to stop movement of the touch position, processing in steps S117 and S118 is performed, so that the cursor position QC at which the cursor C is currently being displayed is newly set as the reference cursor position QA, and the current touch position PB is newly set as the reference touch position PA. When the user then moves the finger into the display 3, the cursor C is immediately moved in the same direction as the direction of movement of the finger.

According to one embodiment described above, when the user moves the finger while touching the display 3, the cursor C is moved on the display 3 along the path obtained by increasing the path of the finger, and, when the user releases the finger in a state in which the cursor C has been moved to a desired position, e.g., the position of the object, such as the startup icon 103, as the target for the operation, processing allocated to the object is performed. As a result, in a case where the user operates the mobile phone 1 while holding the mobile phone 1 with one hand, the user can operate the object and the like on the display 3 that the user can hardly reach with the thumb, and can smoothly operate the mobile phone 1.

Furthermore, according to one embodiment, when the user moves the finger on the display 3 so that the cursor position QB is moved beyond the upper side of the display 3, the notification list screen 104 is displayed on the display 3, and, when the user selects desired one of the notification information pieces with the finger and then releases the finger, the application corresponding to the notification information piece is executed. When the user releases the finger without selecting any of the notification information pieces, the notification list screen 104 is closed. As a result, the user can achieve operation to execute, after calling the notification list screen 104 onto the display 3, the application corresponding to the desired notification information piece and operation to close, after calling the notification list screen 104, the notification list screen 104 through a series of operations to move the finger on the display 3 and then release the finger. This allows the user to operate the mobile phone 1 more smoothly.

Furthermore, according to one embodiment, the notification list screen 104 is displayed when the cursor position QB is moved beyond the upper boundary line UL set out of the display 3. Thus, when the cursor position QB is slightly moved out of the display 3 by the user greatly moving the finger by mistake, the notification list screen 104 is not displayed.

Furthermore, according to one embodiment, the reference touch position PA and the reference cursor position QA are set on the display 3 before the finger with which the display 3 is touched is moved, and, when the touch position PB is detected after the start of movement of the finger, the first vector VP between the detected touch position PB and the reference touch position PA is calculated. The position distant from the reference cursor position QA by the second vector VQ obtained by increasing the first vector VP by the predetermined factor is determined as the cursor position QB. As a result, the cursor position QB is moved along the path obtained by increasing the path of the touch position PB. That is to say, since the reference touch position PA and the reference cursor position QA are fixed, and the reference touch position PA and the reference cursor position QA are not updated each time the touch position is detected, arithmetic processing to determine the cursor position QB is less likely to be complicated.

Furthermore, according to one embodiment, in a case where the cursor position QB is moved out of the displayable area RA, the different cursor position QC is set on the display 3, and the cursor C is displayed at the cursor position QC. As a result, even when the cursor position QB is moved out of the displayable area RA, the cursor C remains on the display 3. This allows the user to recognize that the operation mode is the cursor mode, and the cursor position QB is out of a range in which the cursor C can be displayed.

In addition, in one embodiment, the touch position PB when the cursor position QB is out of the displayable area RA is newly set as the reference touch position PA, and the different cursor position QC is newly set as the reference cursor position QA. As a result, when the user moves the finger into the display 3 in a state in which the cursor position QB is out of the displayable area RA, the cursor C is immediately moved. A direction in which the cursor C is started to be moved is the same as the direction of movement of the finger.

Figure 11:
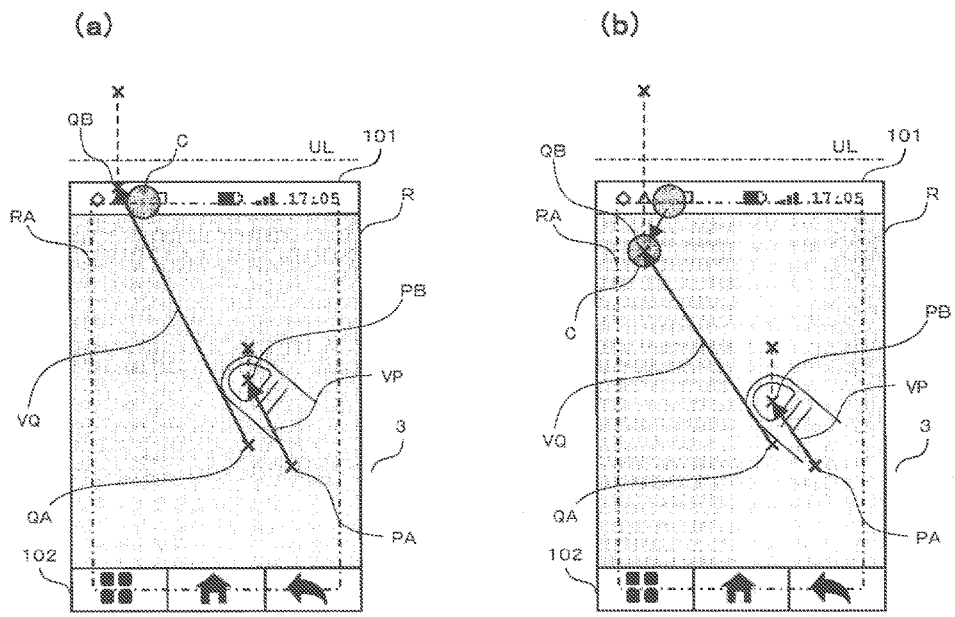
FIG. 11 illustrates configuration to be compared with configuration in one embodiment.

As illustrated in FIG. 11, in a case where the reference touch position PA and the reference cursor position QA are not changed after the cursor position QB is moved out of the displayable area RA, the cursor C is not started to be moved unless the cursor position QB is moved into the displayable area RA by moving the finger into the display 3 to some extent. This means that the cursor C is not immediately moved even when the user moves the finger, and thus the user may feel that the cursor C is unresponsive (see a part (a) of FIG. 11). In addition, the direction in which the cursor C is started to be moved is different from the direction of movement of the finger, and thus the user may feel uncomfortable (see a part (b) of FIG. 11). In one embodiment, however, the cursor C is immediately moved in the same direction as the direction of movement of the finger when the user moves the finger into the display 3, and thus the user is less likely to feel that the cursor C is unresponsive or to feel uncomfortable.

Furthermore, in one embodiment, the touch position PB when movement of the touch position is stopped in a state in which the cursor position QB is out of the displayable area RA is set as the reference touch position PA, and the different cursor position QC is set as the reference cursor position QA. After moving the finger in such a direction that the cursor position QB is moved away from the display 3, the user usually stops moving the finger to move the finger in such a direction that the cursor position QB is moved onto the display 3. The reference touch position PA and the reference cursor position QA can thus be changed at a proper timing immediately before the user moves the finger to move the cursor position QB onto the display 3.

Although one embodiment of the present disclosure has been described so far, the present disclosure is in no way limited to one embodiment described above and the like, and various modifications other than those described above can be made on one embodiment of the present disclosure.

Modification 1

In one embodiment described above, the notification list screen 104 is displayed when the user moves the finger upwards so that the cursor position QB is moved beyond the upper side of the display 3. In modification 1, the notification list screen 104 is displayed when the user moves the finger upwards so that the cursor position QB is moved beyond the upper side of the display 3, and then moves the finger downwards.

Figure 12:
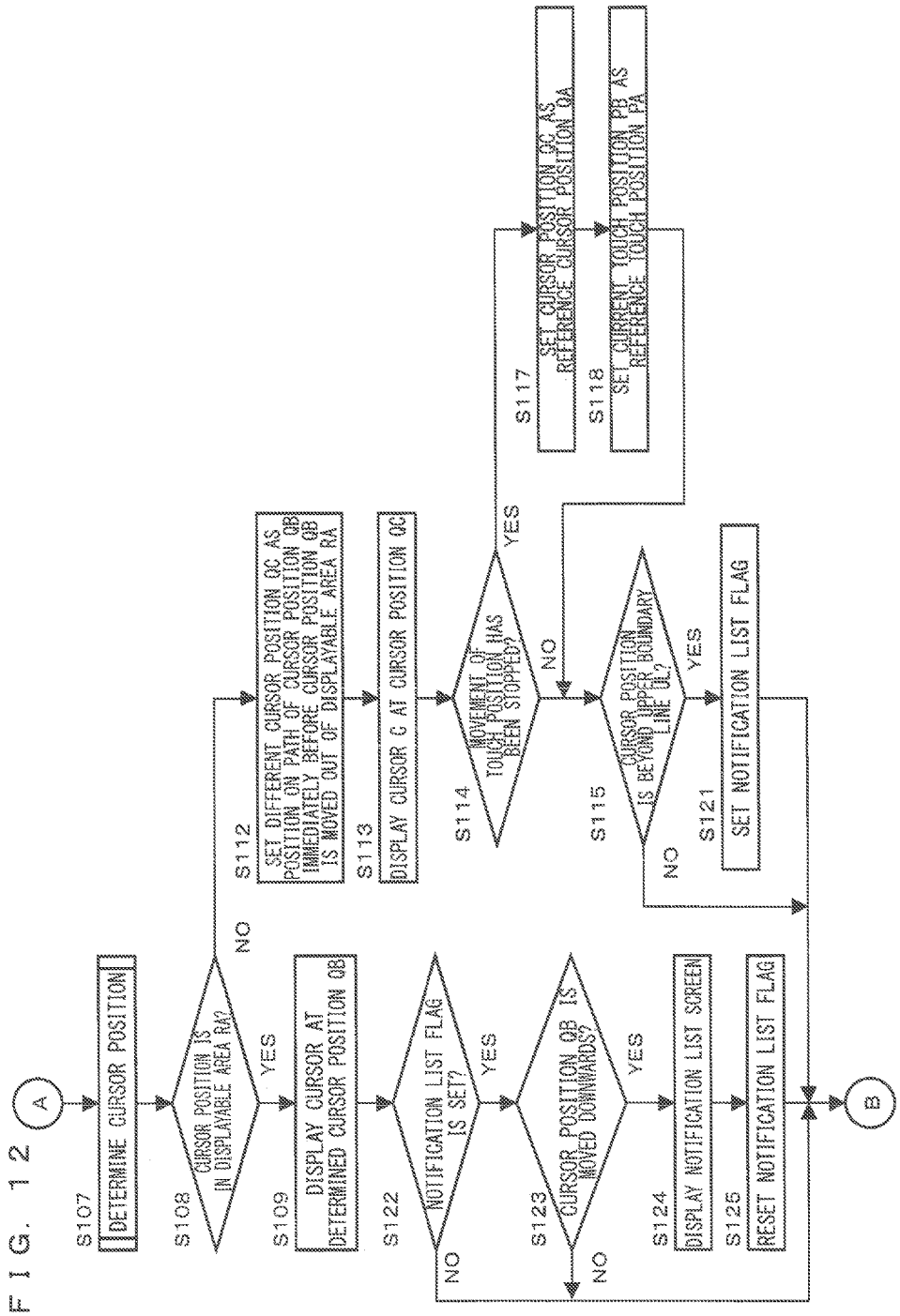
FIG. 12 illustrates a flowchart showing control processing in the cursor mode according to modification 1.
Figure 13:
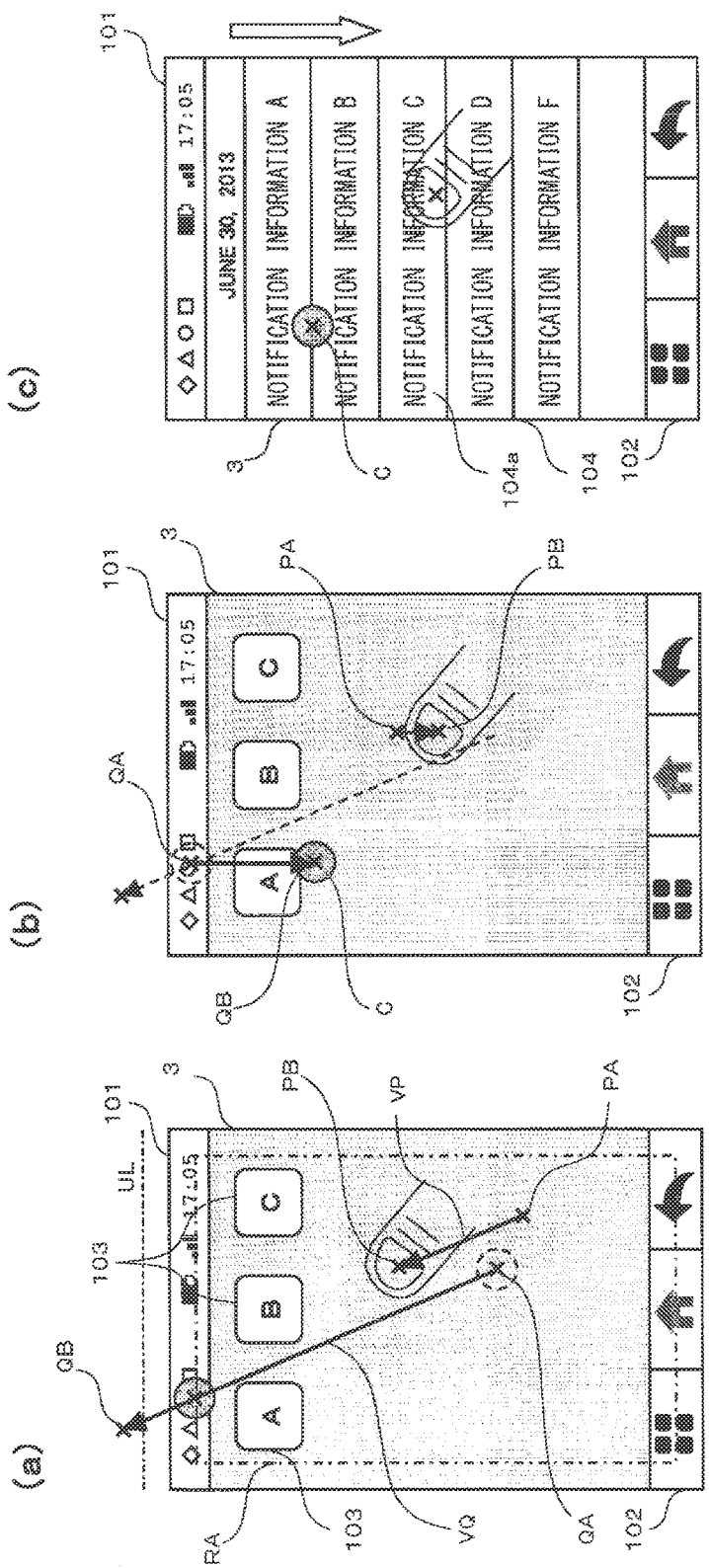
FIG. 13 illustrates examples of screen display in a case where control processing in the cursor mode is performed according to modification 1.

FIG. 12 illustrates a flowchart showing control processing in the cursor mode according to modification 1. FIG. 13 illustrates examples of screen display in a case where control processing in the cursor mode is performed according to modification 1.

The flowchart of FIG. 12 is the same as the flowchart of FIG. 7 except that processing in step S116 has been replaced by processing in step S121, and processing in steps S122 to S125 has been added after processing in step S109. The flowchart of FIG. 12 is connected to the flowchart of FIG. 6 at signs A and B.

In modification 1, when it is determined that the cursor position QB is beyond the upper boundary line UL in step S115 (S115: YES), a notification list flag is set (S121). As illustrated in a part (a) of FIG. 13, the notification list screen 104 is not displayed when the cursor position QB is only beyond the upper boundary line UL.

In modification 1, when displaying the cursor C at the cursor position QB in step S109, the control module 11 determines whether the notification list flag is set (S122). When the notification list flag is set (S122: YES), the control module 11 further determines whether the cursor position QB is moved downwards (S123).

As illustrated in a part (b) of FIG. 13, in a case where the user moves the finger downwards after the cursor position QB is moved beyond the upper boundary line UL, the cursor position QB is moved downwards, and the cursor C is displayed at the cursor position QB. In this case, the control module 11 determines that the notification list flag is set (S122: YES), and further determines that the cursor position QB is moved downwards (S123: YES). As a result, the control module 11 displays the notification list screen 104 on the display 3 as illustrated in a part (c) of FIG. 13 (S124). The notification list screen 104 is displayed to appear from the lower end of the notification bar 101. When the notification list screen 104 is displayed (S124), the control module 11 resets the notification list flag (S125).

According to modification 1, the notification list screen 104 is displayed to appear downwards by moving the finger downwards as if the notification list screen 104 was drawn, and thus an intuitive and easy operation can be achieved.

Modification 2

In one embodiment, the notification list screen 104 is displayed when the user moves the finger upwards so that the cursor position QB is moved beyond the upper side of the display 3. In modification 2, an operation menu screen 106 is displayed when the user moves the finger downwards, to the left, or to the right so that the cursor position QB is moved beyond a lower side, a left side, or a right side of the display 3. The operation menu screen 106 is used to operate an application executed on the display 3.

Figure 14:
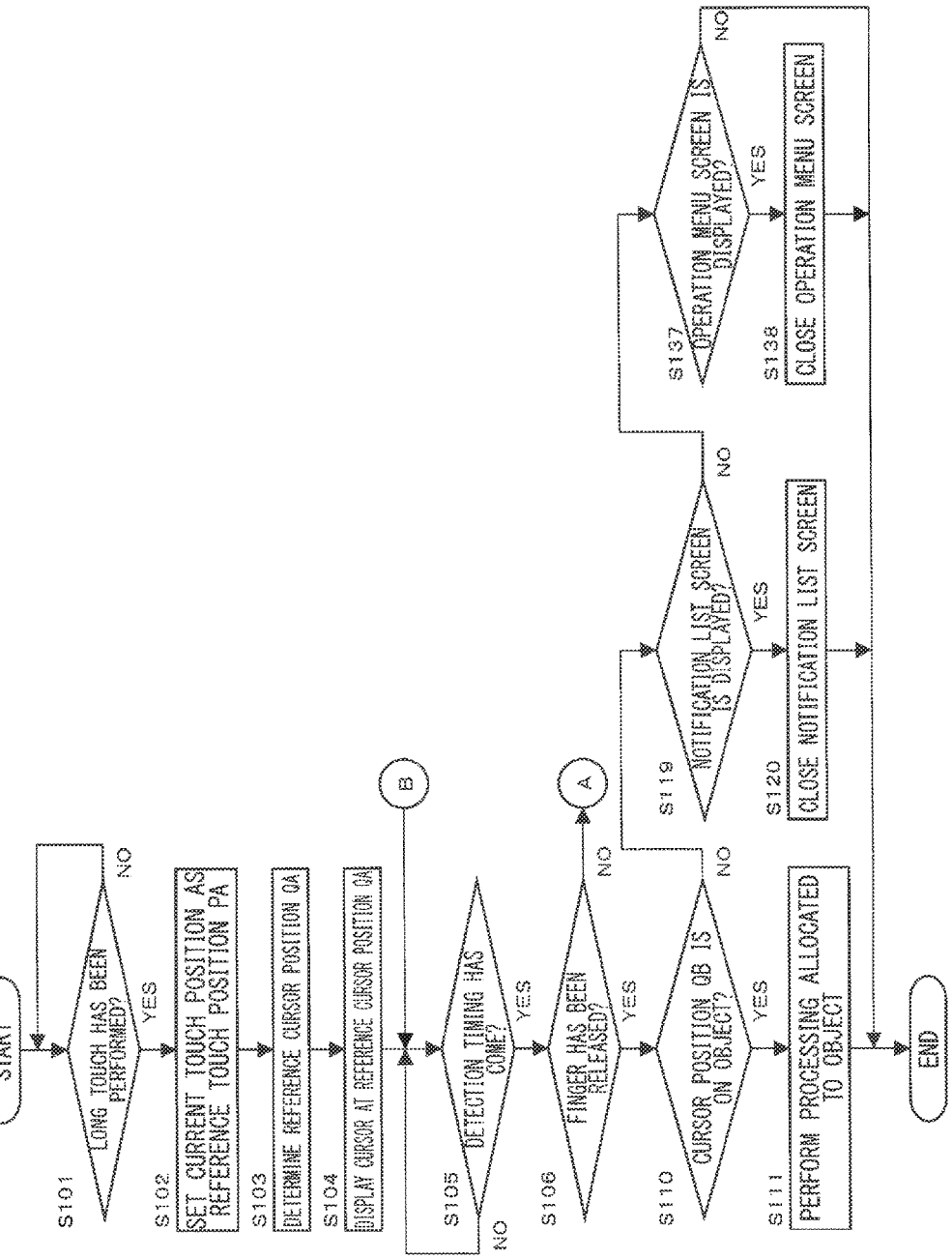
FIG. 14 illustrates a flowchart showing control processing in the cursor mode according to modification 2.
Figure 15:
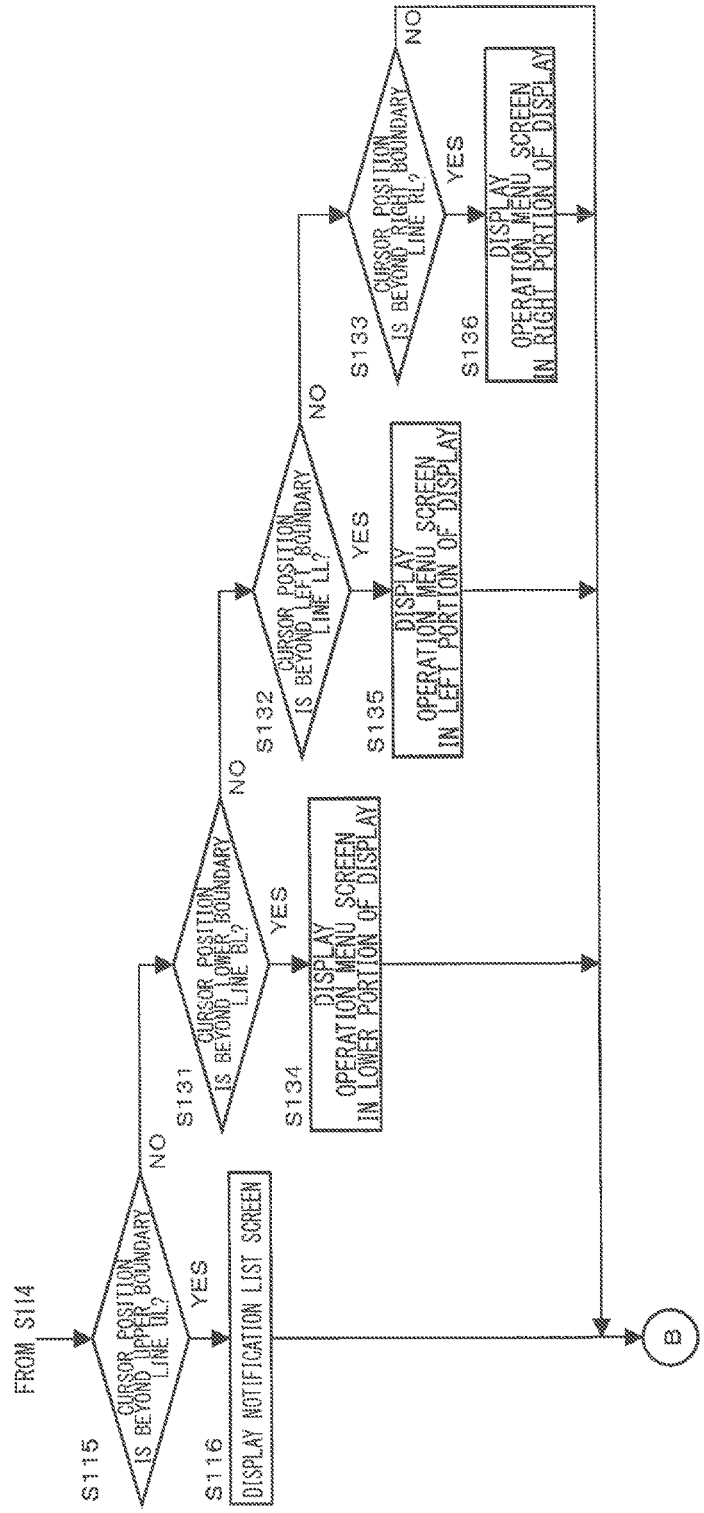
FIG. 15 illustrates a flowchart showing control processing in the cursor mode according to modification 2.

FIGS. 14 and 15 illustrate flowcharts showing control processing in the cursor mode according to modification 2.

Figure 16:
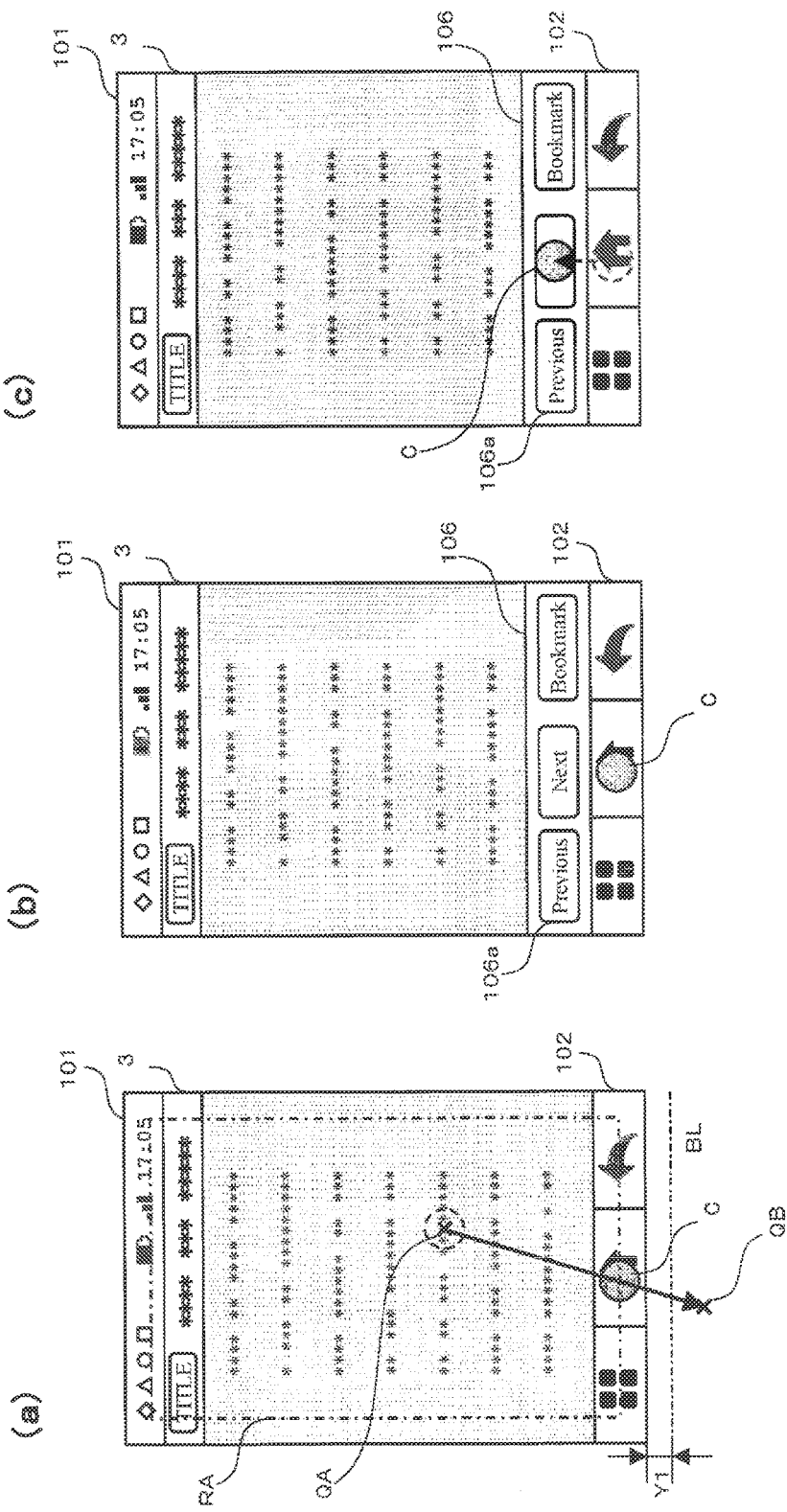
FIG. 16 illustrates examples of screen display in a case where control processing in the cursor mode is performed according to modification 2.
Figure 17:
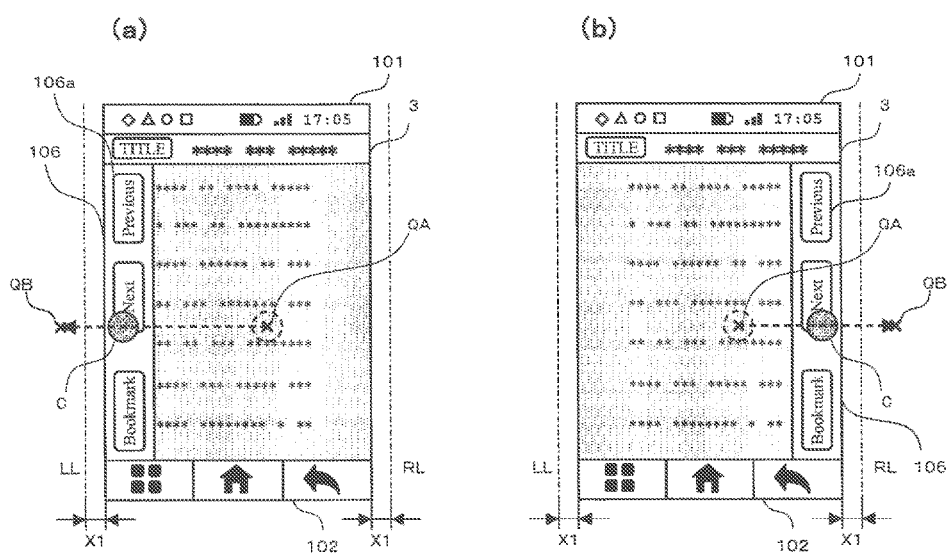
FIG. 17 illustrates examples of screen display in a case where control processing in the cursor mode is performed according to modification 2.

FIGS. 16 and 17 illustrate examples of screen display in a case where control processing in the cursor mode is performed according to modification 2. In FIGS. 16 and 17, one page of a book, which is an operation screen in an e-book application, is displayed on the display 3.

In the flowcharts of FIGS. 14 and 15, processing in steps S131 to S138 has been added to the flowcharts of FIGS. 6 and 7. In FIG. 15, processing in steps S107 to S109, S112 to S114, S117, and S118 in FIG. 7 is omitted for convenience's sake. The flowcharts of FIGS. 14 and 15 are connected to each other at signs A (omitted in FIG. 15) and B.

In modification 2, the control module 11 provides a lower boundary line BL at a position below and distant from the lower side of the display 3 by the predetermined distance Y1 as illustrated in a part (a) of FIG. 16. As illustrated in parts (a) and (b) of FIG. 17, the control module 11 also provides a left boundary line LL at a position to the left of and distant from the left side of the display 3 by a predetermined distance X1, and provides a right boundary line RL at a position to the right of and distant from the right side of the display 3 by the predetermined distance X1. The lower boundary line BL, the left boundary line LL, and the right boundary line RL are thresholds set with respect to the cursor position QB, and are used to determine whether to display the operation menu screen 106 on the display 3. Coordinate data indicating the lower boundary line BL, the left boundary line LL, and the right boundary line RL is stored in the storage module 12.

When determining that the cursor position QB is not beyond the upper boundary line UL (S115: NO), the control module 11 determines whether the cursor position QB is beyond the lower boundary line BL, the left boundary line LL, or the right boundary line RL (S131, S132, and S133).

When the cursor position QB passes through the lower side of the display 3 and is moved beyond the lower boundary line BL by the user moving the finger downwards as illustrated in the part (a) of FIG. 16 (S131: YES), the control module 11 displays the operation menu screen 106 in a lower portion of the display 3, i.e., at a position closer to the lower side of the display 3, as illustrated in a part (b) of FIG. 16 (S134). Operation buttons 106a for operating an application are disposed in the operation menu screen 106. In a case where the application is the e-book application, for example, a button for turning a page, a button for returning a page, and the like are disposed in the operation menu screen 106 as the operation buttons 106a.

When the cursor position QB passes through the left side of the display 3 and is moved beyond the left boundary line LL by the user moving the finger to the left as illustrated in the part (a) of FIG. 17 (S132: YES), the control module 11 displays the operation menu screen 106 in a left portion of the display 3, i.e., at a position closer to the left side of the display 3 (S135). When the cursor position QB passes through the right side of the display 3 and is moved beyond the right boundary line RL by the user moving the finger to the right as illustrated in the part (b) of FIG. 17 (S133: YES), the control module 11 displays the operation menu screen 106 in a right portion of the display 3, i.e., at a position closer to the right side of the display 3 (S136).

When the operation menu screen 106 is displayed, the user moves the finger while touching the display 3 to move the cursor C to a desired one of the operation buttons 106a as illustrated in a part (c) of FIG. 16. The user releases the finger from the display 3 in a state in which the cursor C is on the operation button 106a.

When determining that the finger has been released (S106: YES), the control module 11 performs processing allocated to the operation button 106a and relating to the application being executed on the display 3 (S111) as the cursor position QB is on the operation button 106a, which is the object (S110: YES). In a case where the e-book application is executed on the display 3, for example, when the finger is released in a state in which the cursor C is on the button for turning the page, the next page of the book is displayed on the display 3.

In a case where the operation menu screen 106 is closed without operating any of the operation buttons 106a, the user releases the finger in a state in which the cursor C is on none of the operation buttons 106a.

When determining that the cursor position QB is not on the object (S110: NO), and further determining that the notification list screen 104 is not displayed on the display 3 (S119: NO), the control module 11 determines whether the operation menu screen 106 is displayed on the display 3 (S137). When the operation menu screen 106 is displayed (S137: YES), the control module 11 closes the operation menu screen 106 (S138).

According to modification 2, the user can achieve operation to perform, after calling the operation menu screen 106 onto the display 3, processing allocated to the desired operation button 106a and operation to close, after calling the operation menu screen 106, the operation menu screen 106 through a series of operations to move the finger on the display 3 and then release the finger. This allows the user to operate the mobile phone 1 smoothly.

Furthermore, according to modification 2, the operation menu screen 106 is displayed at a position closer to a side of the display 3 through which the cursor position QB passes when the cursor position QB is moved out of the display 3, and thus the user can move the cursor position QB (cursor C) to the operation button 106a in the operation menu screen 106 without greatly moving the finger.

Furthermore, according to modification 2, the operation menu screen 106 is displayed when the cursor position QB is moved beyond the lower boundary line BL, the left boundary line LL, or the right boundary line RL set out of the display 3. Thus, when the cursor position QB is slightly moved out of the display 3 by the user greatly moving the finger by mistake, the operation menu screen 106 is not displayed.

Modification 3

In one embodiment, the notification list screen 104 is displayed when the user moves the finger upwards so that the cursor position QB is moved beyond the upper side of the display 3. In modification 3, in a case where the screen displayed on the display 3 includes a plurality of pages, a page adjacent to a page currently being displayed is displayed when the user moves the finger to the left or to the right so that the cursor position QB is moved beyond the left side or the right side of the display 3.

Figure 18:
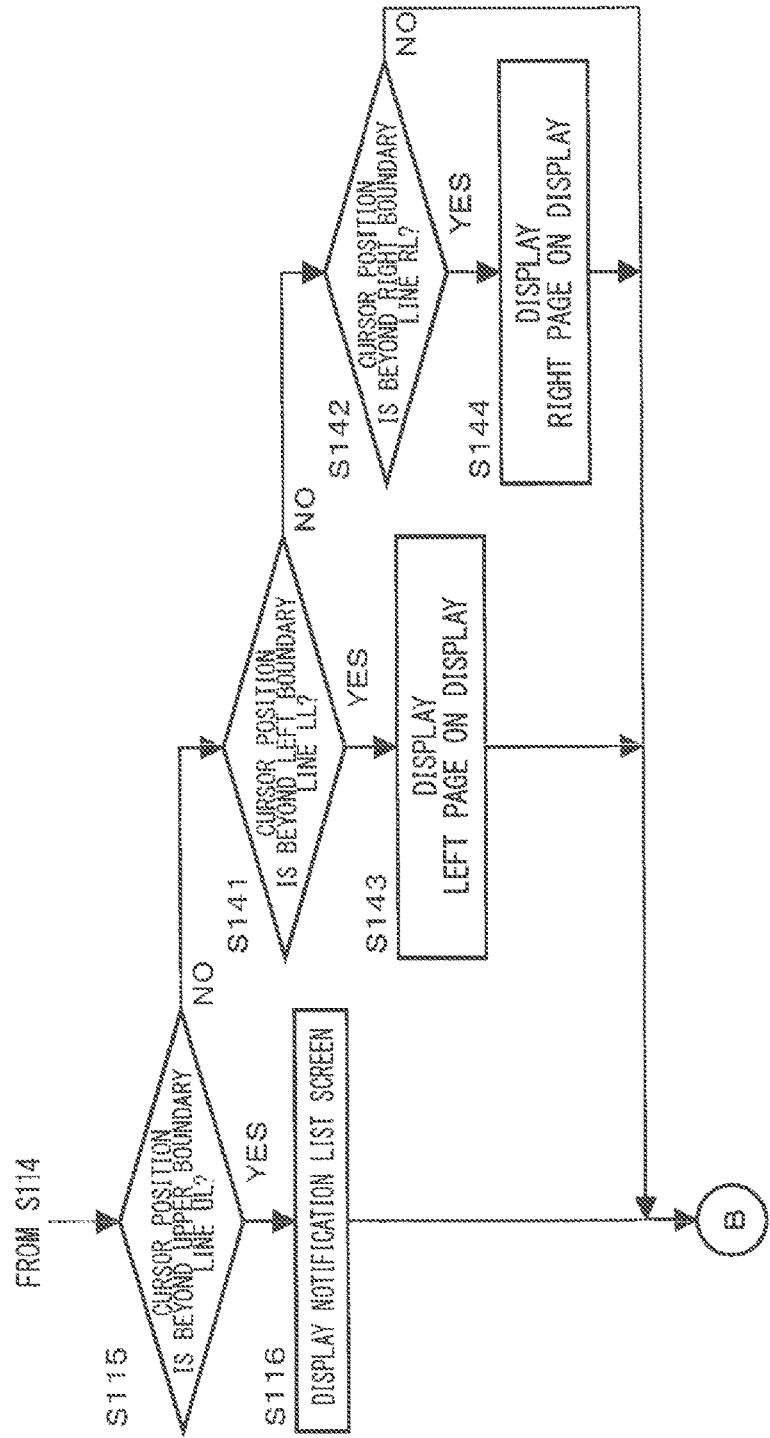
FIG. 18 illustrates a flowchart showing control processing in the cursor mode according to modification 3.
Figure 19:
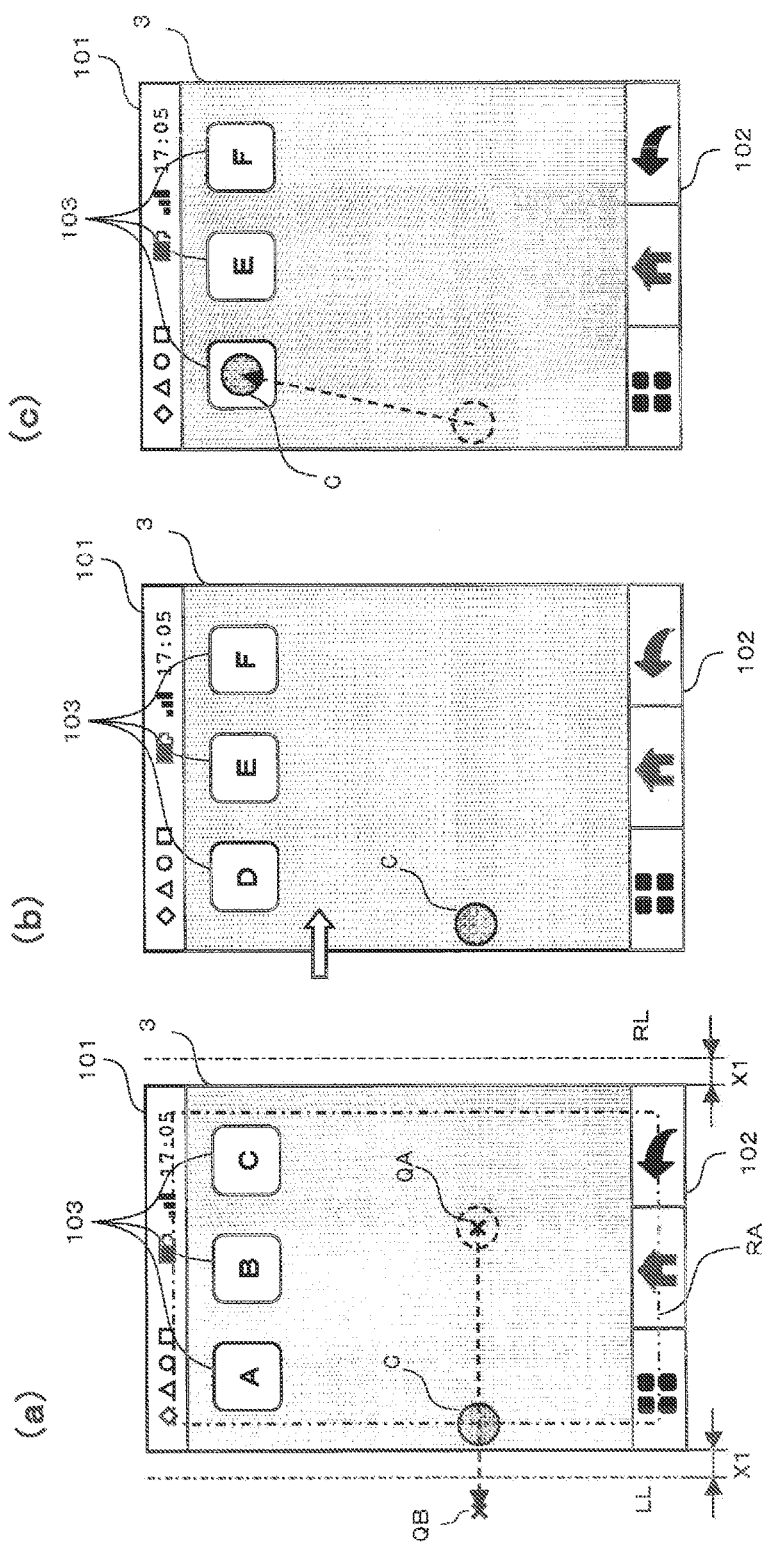
FIG. 19 illustrates examples of screen display in a case where control processing in the cursor mode is performed according to modification 3.

FIG. 18 illustrates a flowchart showing control processing in the cursor mode according to modification 3. FIG. 19 illustrates examples of screen display in a case where control processing in the cursor mode is performed according to modification 3. In FIG. 19, a home screen including a plurality of pages is displayed on the display 3.

In the flowchart of FIG. 18, processing in steps S141 to S144 has been added to the flowchart of FIG. 7. The flowchart of FIG. 18 is the same as the flowchart of FIG. 7 except that processing in steps S107 to S109, S112 to S114, S117, and S118 in FIG. 7 is omitted for convenience's sake. The flowchart of FIG. 18 is connected to the flowchart of FIG. 6 at signs A (omitted in FIG. 18) and B.

In modification 3, as illustrated in a part (a) of FIG. 19, the control module 11 provides the left boundary line LL at the position to the left of and distant from the left side of the display 3 by the predetermined distance X1, and provides the right boundary line RL at the position to the right of and distant from the right side of the display 3 by the predetermined distance X1. The left boundary line LL and the right boundary line RL are thresholds set with respect to the cursor position QB, and are used to determine whether to display an adjacent page on the display 3. Coordinate data indicating the left boundary line LL and the right boundary line RL is stored in the storage module 12.

When determining that the cursor position QB is not beyond the upper boundary line UL (S115: NO), the control module 11 determines whether the cursor position QB is beyond the left boundary line LL or the right boundary line RL (S141 and S142).

When the cursor position QB passes through the left side of the display 3 and is moved beyond the left boundary line LL by the user moving the finger to the left as illustrated in the part (a) of FIG. 19 (S141: YES), the control module 11 displays a left page on the display 3 as illustrated in a part (b) of FIG. 19 (S143). Similarly, when the cursor position QB passes through the right side of the display 3 and is moved beyond the right boundary line RL by the user moving the finger to the right (S142: YES), the control module 11 displays a right page on the display 3 (S144).

When the adjacent page is displayed, the user moves the finger while touching the display 3 to move the cursor C to the object as the target for the operation, i.e., one of the startup icons 103 in the case of the home screen, as illustrated in a part (c) of FIG. 19. The user releases the finger from the display 3 in a state in which the cursor C is on the object.

When determining that the finger has been released (S106: YES), the control module 11 performs processing allocated to the object as the cursor position QB is on the object (S110: YES). In a case where the object is one of the startup icons 103, for example, the control module 11 starts an application corresponding to the startup icon 103, and displays an operation screen in the application on the display 3.

According to modification 3, the user can achieve operation to perform, after calling the adjacent page onto the display 3, processing allocated to the desired object through a series of operations to move the finger on the display 3 and then release the finger. This allows the user to operate the mobile phone 1 smoothly.

Modification 4

In one embodiment, the reference touch position PA and the reference cursor position QA are updated when movement of the touch position is stopped in a state in which the cursor position QB is out of the displayable area RA. In modification 4, updating of the reference touch position PA and the reference cursor position QA is repeated on a regular basis while the cursor position QB is out of the displayable area RA.

Figure 20:
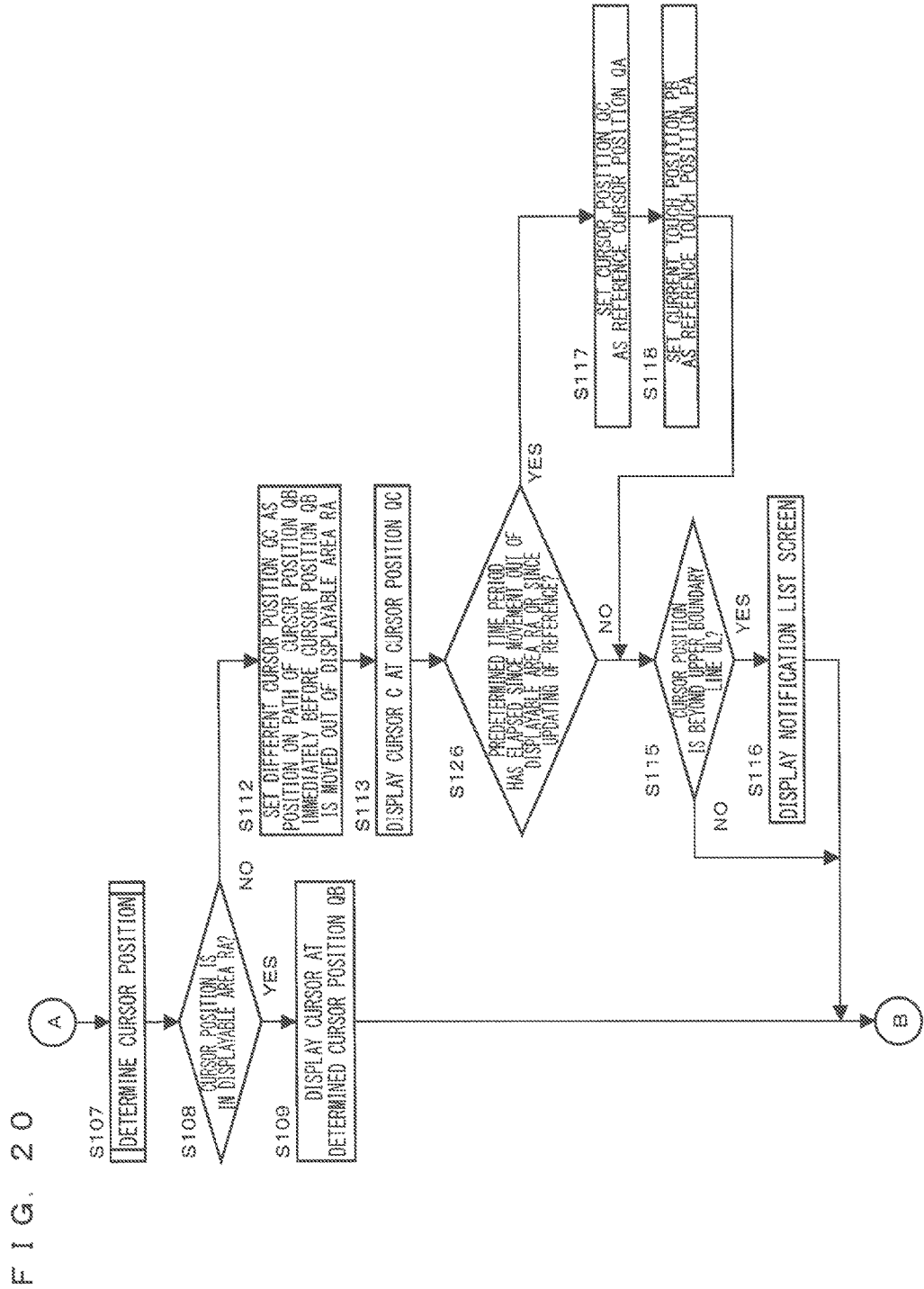
FIG. 20 illustrates a flowchart showing control processing in the cursor mode according to modification 4.

FIG. 20 illustrates a flowchart showing control processing in the cursor mode according to modification 4. In the flowchart of FIG. 20, processing in step S114 in the flowchart of FIG. 7 has been replaced by processing in step S126.

In modification 4, in a case where the cursor position QB is moved out of the displayable area RA, the control module 11 initially determines whether a predetermined time period has elapsed since movement of the cursor position QB out of the displayable area RA, and determines, after the reference touch position PA and the reference cursor position QA are once updated, whether a predetermined time period has elapsed since updating of the reference touch position PA and the reference cursor position QA (S126). When determining that the predetermined time period has elapsed (S126: YES), the control module 11 newly sets the different cursor position QC as the reference cursor position QA (S117), and newly sets the current touch position PB as the reference touch position PA (S118).

The predetermined time period is shorter than an estimated time period from movement of the cursor position QB out of the displayable area RA until the user who has noticed the movement returns the cursor position QB onto the display 3. The predetermined time period may be equal to or longer than each of intervals at which the touch detection module 14 detects the touch position. The predetermined time period can be set to be a time period of several milliseconds to several tens of milliseconds, for example.

According to modification 4, as in one embodiment described above, in a case where the cursor position QB is moved out of the displayable area RA, the cursor C is immediately moved in the same direction as the direction of movement of the finger when the user moves the finger into the display 3, and thus the user is less likely to feel that the cursor C is unresponsive or to feel uncomfortable.

Other Modifications

In one embodiment, the displayable area RA is set on the display 3 as the cursor C is rendered so as to have the center at the cursor position QB. The displayable area RA, however, may not be set on the display 3 by rendering the cursor C inside the display 3 with respect to the cursor position QB. In this case, when the cursor position QB is moved out of the display 3, the control module 11 sets a different cursor position QB on the display 3, and displays the cursor C.

In modification 2 described above, the upper boundary line UL may be used as a threshold for displaying the operation menu screen 106, and, in a case where the cursor position QB is moved beyond the upper boundary line UL, the control module 11 may display the operation menu screen 106 at a position closer to the upper side of the display 3. In modification 2 described above, the left boundary line LL and the right boundary line RL may be used as thresholds for displaying the adjacent page, and, in a case where the cursor position QB is moved beyond the left boundary line LL or the right boundary line RL, the control module 11 may display a page adjacent to a page previously displayed.

In modification 3 described above, in a case where the cursor position QB is moved beyond the left boundary line LL or the right boundary line RL, the page adjacent to the page previously displayed is displayed, but a page not adjacent to the previous page may be displayed.

In one embodiment, the notification list screen 104 is closed when the finger is released at a position other than a position of any of the display fields 104a, which is the object, in a state in which the notification list screen 104 is displayed. One embodiment, however, is not limited to that having the above-mentioned structure. For example, the notification list screen 104 may not be closed even when the finger is released, and then may be closed when the tap operation is performed on a lower portion of the notification list screen 104. The notification list screen 104 may be closed when the display 3 is touched again in a state in which the notification list screen 104 is displayed, and then the finger is moved so that the cursor position QB is moved beyond the upper boundary line UL while the display 3 is touched.

In one embodiment, the reference touch position PA and the reference cursor position QA are changed based on movement of the cursor position QB out of the displayable area RA. The reference touch position PA and the reference cursor position QA, however, may not be changed based on movement out of the displayable area RA.

In one embodiment described above, the reference touch position PA and the reference cursor position QA are updated when movement of the touch position is stopped in a state in which the cursor position QB is out of the displayable area RA. One embodiment, however, is not limited to that having such a structure. In one embodiment described above, the reference touch position PA and the reference cursor position QA may be updated when it is determined that the notification list screen 104 is displayed by moving the cursor position QB beyond the upper boundary line UL.

Similarly, in modification 2, the reference touch position PA and the reference cursor position QA may be updated when it is determined that the notification list screen 104 is displayed by moving the cursor position QB beyond the upper boundary line UL and when it is determined that the operation menu screen 106 is displayed by moving the cursor position QB beyond the lower boundary line BL, the left boundary line LL, or the right boundary line RL.

Furthermore, in modification 3, the reference touch position PA and the reference cursor position QA may be updated when it is determined that the notification list screen 104 is displayed by moving the cursor position QB beyond the upper boundary line UL and when it is determined that the adjacent page is displayed by moving the cursor position QB beyond the left boundary line LL or the right boundary line RL.

In one embodiment, when the cursor position QB is moved out of the displayable area RA, the different cursor position QC is set at a position on the path of the cursor position QB immediately before the cursor position QB is moved out of the displayable area RA, and the cursor C is displayed at the set cursor position QC. The cursor C, however, may not be displayed when the cursor position QB is moved out of the displayable area RA. In this case, in FIG. 7, processing in steps S112 and S113 is removed, and, in processing in step S117, a predetermined position on the display 3, e.g., a position on the path of the cursor position QB immediately before the cursor position QB is moved out of the displayable area RA, is newly set as the reference cursor position QA.

Figure 21:
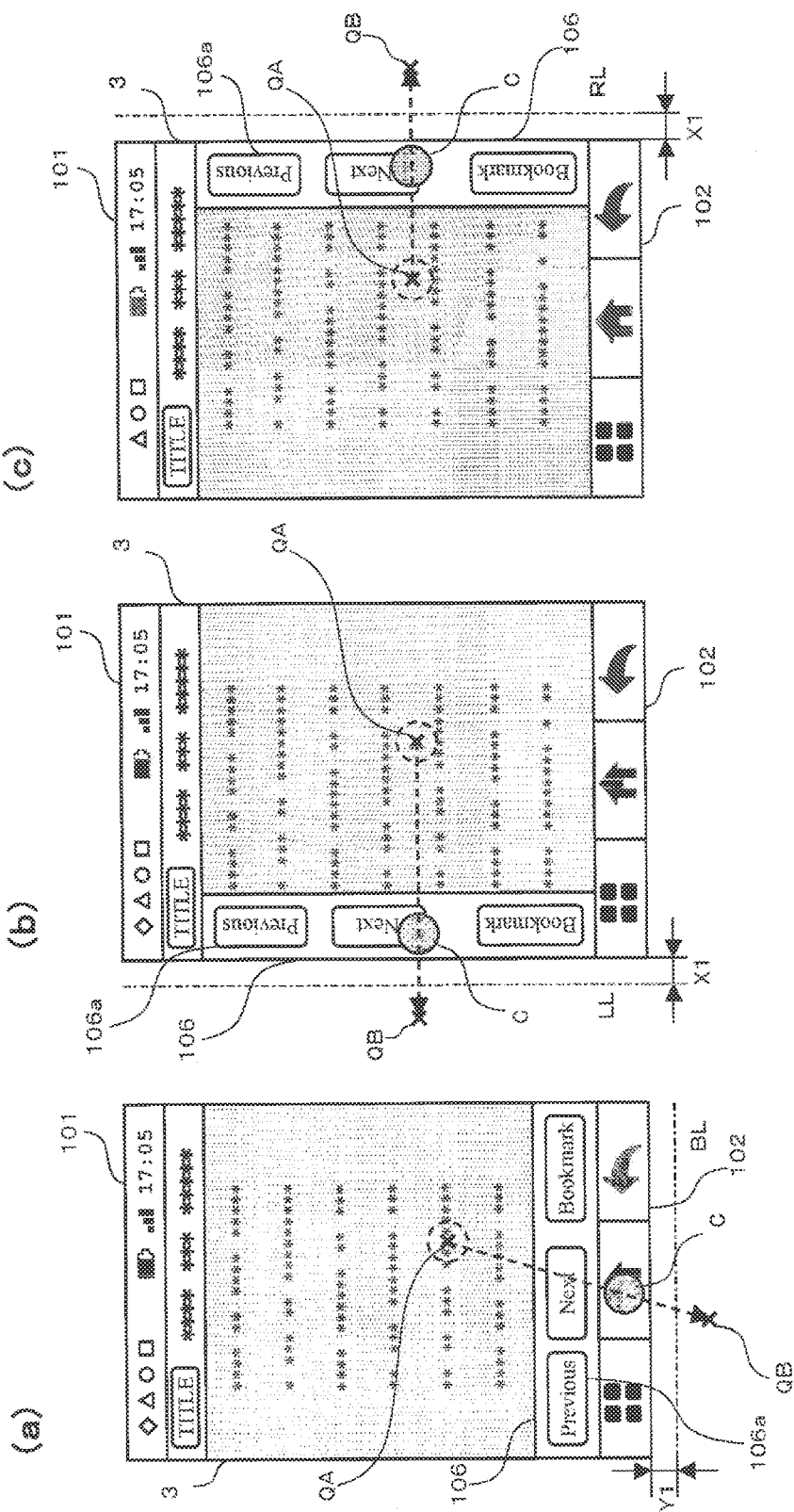
FIG. 21 illustrates a diagram for explaining examples in which an operation menu screen is displayed when a cursor position is moved out of the display according to another modification.

In one embodiment described above, the notification list screen 104 is displayed when the user moves the finger upwards so that the cursor position QB is moved beyond the upper side of the display 3. In addition to the above-mentioned structure, however, as illustrated in FIG. 21, the operation menu screen 106 may be displayed when the user moves the finger downwards, to the left, or to the right so that the cursor position QB is moved beyond the lower side, the left side, or the right side of the display 3. The operation menu screen 106 is used to operate the application executed on the display 3. The operation buttons 106a for operating the application are disposed in the operation menu screen 106. As illustrated in FIG. 21, in a case where the executed application is the e-book application, for example, the button for turning the page, the button for returning the page, and the like are disposed in the operation menu screen 106 as the operation buttons 106a.

In this example, the control module 11 provides the lower boundary line BL at the position below and distant from the lower side of the display 3 by the predetermined distance Y1, provides the left boundary line LL at the position to the left of and distant from the left side of the display 3 by the predetermined distance X1, and provides the right boundary line RL at the position to the right of and distant from the right side of the display 3 by the predetermined distance X1.

When the cursor position QB passes through the lower side of the display 3 and is moved beyond the lower boundary line BL by the user moving the finger downwards as illustrated in a part (a) of FIG. 21, the control module 11 displays the operation menu screen 106 in the lower portion of the display 3. When the cursor position QB passes through the left side of the display 3 and is moved beyond the left boundary line LL by the user moving the finger to the left as illustrated in a part (b) of FIG. 21, the control module 11 displays the operation menu screen 106 in the left portion of the display 3. When the cursor position QB passes through the right side of the display 3 and is moved beyond the right boundary line RL by the user moving the finger to the right as illustrated in a part (c) of FIG. 21, the control module 11 displays the operation menu screen 106 in the right portion of the display 3.

When the cursor C is moved to one of the operation buttons 106a, and then the finger is released, processing allocated to the operation button 106a and relating to the application being executed on the display 3 is performed. In a case where the e-book application is executed on the display 3, for example, when the finger is released in a state in which the cursor C is on the button for turning the page, the next page of the book is displayed on the display 3.

Figure 22:
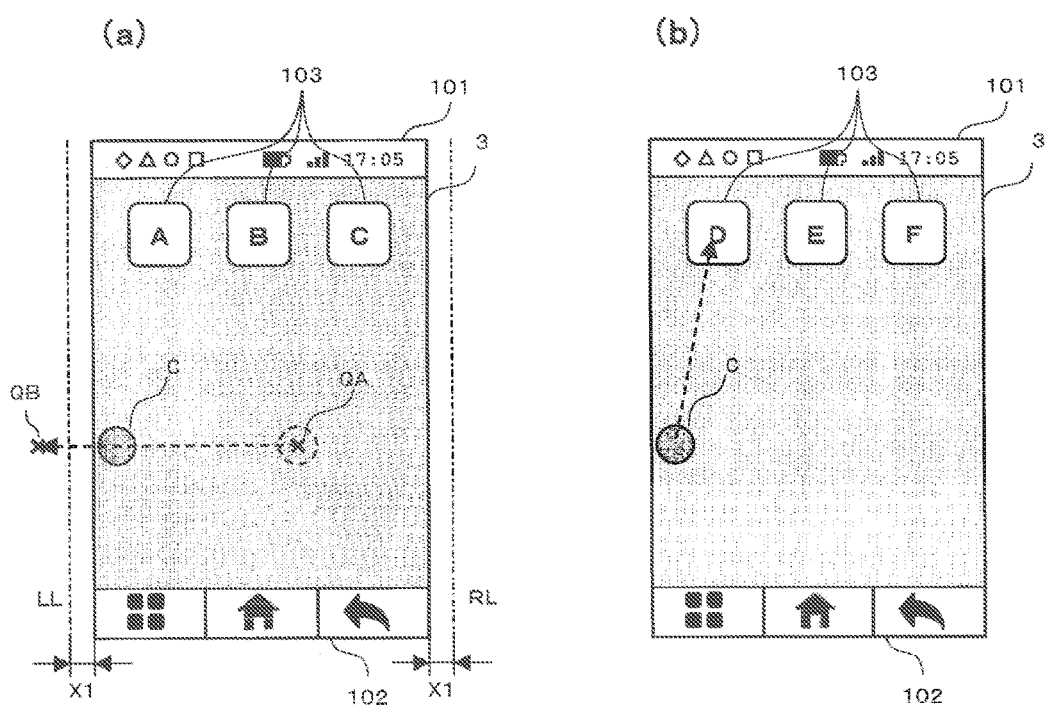
FIG. 22 illustrates a diagram for explaining an example in which an adjacent page is displayed when the cursor position is moved out of the display according to yet another modification.

As illustrated in FIG. 22, in a case where the screen displayed on the display 3 includes a plurality of pages, a page adjacent to a page currently being displayed may be displayed when the user moves the finger to the left or to the right so that the cursor position QB is moved beyond the left side or the right side of the display 3. In FIG. 22, the home screen in which the startup icons 103 are arranged is displayed on the display 3.

In this example, when the cursor position QB passes through the left side of the display 3 and is moved beyond the left boundary line LL by the user moving the finger to the left as illustrated in a part (a) of FIG. 22, the control module 11 displays a left page on the display 3 as illustrated in a part (b) of FIG. 22. Similarly, when the cursor position QB passes through the right side of the display 3 and is moved beyond the right boundary line RL by the user moving the finger to the right, the control module 11 displays a right page on the display 3.

When the cursor C is moved to one of the startup icons 103, and then the finger is released, an application corresponding to the startup icon 103 is started on the display 3.

In one embodiment, the upper boundary line UL is provided, and, when the cursor position QB is moved beyond the upper boundary line UL, the control module 11 displays the notification list screen 104. The upper boundary line UL, however, may not be provided. In this case, the control module 11 displays the notification list screen 104 when the cursor position QB is moved beyond the upper side of the display 3 (display area R).

Similarly, in modification 2 and in the example of FIG. 21, the lower boundary line BL, the left boundary line LL, and the right boundary line RL may not be provided. The control module 11 may display the operation menu screen 106 when the cursor position QB is moved beyond the lower side, the left side, or the right side of the display 3 (display area R). Furthermore, in modification 3 and in the example of FIG. 22, the left boundary line LL and the right boundary line RL may not be provided. The control module 11 may display the adjacent page when the cursor position QB is moved beyond the left side or the right side of the display 3 (display area R).

Although the reference cursor position QA and the reference touch position PA are set at different positions in one embodiment, they may be set at the same position.

Although the operation mode transitions to the cursor mode based on the long touch operation in one embodiment, the operation mode may transition to the cursor mode based on another operation, such as the double tap operation and an operation on a hard key. In this case, a position, on the display 3, first touched with the finger after transition to the cursor mode is set as the reference touch position PA.

In one embodiment, the reference touch position PA and the reference cursor position QA are updated when movement of the touch position is stopped in a state in which the cursor position QB is out of the displayable area RA. One embodiment, however, is not limited to that having such as a structure. In one embodiment described above, the reference touch position PA and the reference cursor position QA may be updated when it is determined that the notification list screen 104 is displayed by moving the cursor position QB beyond the upper boundary line UL.

Similarly, in the structure of FIG. 21, the reference touch position PA and the reference cursor position QA may be updated when it is determined that the notification list screen 104 is displayed by moving the cursor position QB beyond the upper boundary line UL and when it is determined that the operation menu screen 106 is displayed by moving the cursor position QB beyond the lower boundary line BL, the left boundary line LL, or the right boundary line RL.

Furthermore, in the structure of FIG. 22, the reference touch position PA and the reference cursor position QA may be updated when it is determined that the notification list screen 104 is displayed by moving the cursor position QB beyond the upper boundary line UL and when it is determined that the adjacent page is displayed by moving the cursor position QB beyond the left boundary line LL or the right boundary line RL.

Although the notification list screen 104 has the same size as the window area RW in one embodiment, the notification list screen 104 may have a smaller size than the window area RW. In this case, as in modification 2 and in the example of FIG. 21, the upper boundary line UL, the lower boundary line BL, the left boundary line LL, and the right boundary line RL may be provided, and, when the cursor position QB is moved beyond any of the upper boundary line UL, the lower boundary line BL, the left boundary line LL, and the right boundary line RL, the notification list screen 104 may be displayed at a position closer to a side of the display 3 corresponding to the any of the upper boundary line UL, the lower boundary line BL, the left boundary line LL, and the right boundary line RL through which the cursor position QB passes.

The present disclosure is not limited to mobile phones, and is applicable to various portable apparatuses, including personal digital assistants (PDAs), tablet PCs, e-book terminals, portable music players, portable TVs, and portable navigation systems.

Various modifications can appropriately be made on embodiments of the present disclosure within range of technical ideas disclosed in claims.

The invention claimed is:

1. A portable apparatus comprising:
  a display;
  a detector configured to detect a touch position, on the display, at which a touch is made; and
  a processor configured to control the display based on results of detection by the detector, wherein
  the processor:
    when the touch position is moved, moves a cursor position along a path obtained by increasing a path length of the moved touch position, wherein the increased path length is a predetermined factor times a distance the touch position is moved, and displays a cursor at the cursor position on the display,
    when the touch position is no longer detected by the detector in a state in which a first screen is displayed on the display and the cursor position is on the display, performs processing allocated to the cursor position concerning the first screen,
    displays a second screen on the display based on movement of the cursor position out of the display before the touch position is no longer detected by the detector, and
    when the touch position is no longer detected by the detector in a state in which the second screen is displayed on the display, performs processing allocated to the cursor position concerning the second screen.

2. The portable apparatus according to claim 1, wherein:
  the second screen comprises a list screen showing a list of notification information pieces, and
  when the touch position is no longer detected by the detector in a state in which the cursor position is on any one of the notification information pieces in the list screen, the processor executes an application corresponding to the notification information piece on the display.

3. The portable apparatus according to claim 2, wherein:
  when the touch position is no longer detected by the detector in a state in which the cursor position is on none of the notification information pieces in the list screen, the processor closes the list screen.

4. The portable apparatus according to claim 1, wherein:
  the first screen comprises an operation screen in an application, the second screen comprises an operation menu screen in which an object for operating the application is disposed, and when the touch position is no longer detected by the detector in a state in which the cursor position is on the object, the processor performs processing allocated to the object and relating to the application.

5. The portable apparatus according to claim 1, wherein:
the second screen has a smaller size than the display, and
the processor displays the second screen at a position, on the display, closer to a side of the display through which the cursor position passes when the cursor position is moved out of the display.

6. The portable apparatus according to claim 1, wherein:
the first screen comprises one of a plurality of pages constituting a screen, and
the second screen comprises a page different from the first screen.

7. The portable apparatus according to claim 1, wherein:
the processor:
   sets a first reference position and a second reference position on the display before the touch position is moved, the first reference position relating to the touch position, the second reference position relating to the cursor position, and
   when the touch position is moved, determines, as the cursor position, a position distant from the second reference position by a second vector obtained by increasing a first vector between the touch position detected by the detector and the first reference position to move the cursor position along the path obtained by increasing the path of the touch position.

8. The portable apparatus according to claim 7, wherein:
in a case where the cursor position is out of a range in which the cursor is capable of being displayed on the display,
the processor:
   provides a different cursor position on the display, and displays the cursor at the different cursor position, and
   sets, as the first reference position, the touch position when the cursor position is out of the range in which the cursor is capable of being displayed, and sets the different cursor position as the second reference position.

9. The portable apparatus according to claim 8, wherein:
the processor sets, as the first reference position, the touch position when movement of the touch position is stopped in a state in which the cursor position is out of the range in which the cursor is capable of being displayed.

10. The portable apparatus according to claim 1, wherein:
in a case where the cursor position is out of a range in which the cursor is capable of being displayed on the display, the processor provides a different cursor position on the display, and displays the cursor at the different cursor position.

\* \* \* \* \*